United States Patent
Calendrille, Jr.

(10) Patent No.: US 6,862,948 B1
(45) Date of Patent: Mar. 8, 2005

(54) SHIFTER FOR A BICYCLE USING A DUAL ACTION LEVER WHICH MOVES IN THE SAME MOTION AS THE NATURAL MOVEMENT OF THE THUMB

(76) Inventor: John L. Calendrille, Jr., 11 Keswick La., Plainview, NY (US) 11803

(*) Notice: Subject to any disclaimer, the term of this patent is extended or adjusted under 35 U.S.C. 154(b) by 119 days.

(21) Appl. No.: 10/272,235

(22) Filed: Oct. 16, 2002

Related U.S. Application Data

(60) Provisional application No. 60/330,282, filed on Oct. 18, 2001.

(51) Int. Cl.[7] ............................................. G05G 11/00
(52) U.S. Cl. ........................ 74/502.2; 74/501.6; 74/489
(58) Field of Search ............................ 74/502.2, 501.6, 74/489, 506

(56) References Cited

U.S. PATENT DOCUMENTS

| | | |
|---|---|---|
| 4,343,201 A | 8/1982 | Shimano |
| 5,012,692 A | 5/1991 | Nagano |
| 5,203,213 A | 4/1993 | Nagano |
| 5,303,608 A | 4/1994 | Iwasaki |
| 5,768,945 A * | 6/1998 | Ose ............................ 74/502.2 |
| 6,095,010 A | 8/2000 | Arbeiter et al. |
| 6,155,132 A | 12/2000 | Yamane |
| 6,305,237 B1 | 10/2001 | Ichida |
| 2001/0023621 A1 | 9/2001 | Blaschke et al. |

* cited by examiner

*Primary Examiner*—David A. Bucci
*Assistant Examiner*—Bradley J. Van Pelt
(74) *Attorney, Agent, or Firm*—Richard M. Goldberg

(57) ABSTRACT

A shift lever for a bicycle having a derailleur, includes a housing including a clamp head for mounting the housing on a handlebar of the bicycle and a cavity therein; a gear connected with the cable, rotatably mounted in the cavity and having first and second sets of teeth; a major pawl element mounted to the housing and biased by a spring into engagement with the first set of teeth; a main lever rotatably mounted to the housing, having a thumb engaging end and a substantially common axis of movement with a person's thumb during a shifting operation, such that the main lever moves in a natural direction of movement of the thumb to tighten a grip of the person on the handlebar on which the shift lever is mounted; and a minor pawl element for engaging the second set of teeth.

17 Claims, 26 Drawing Sheets

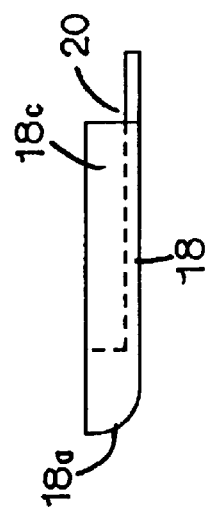
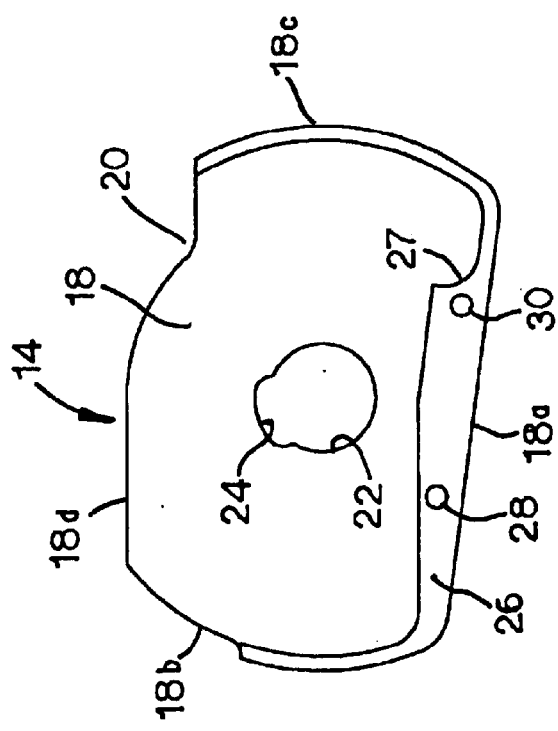
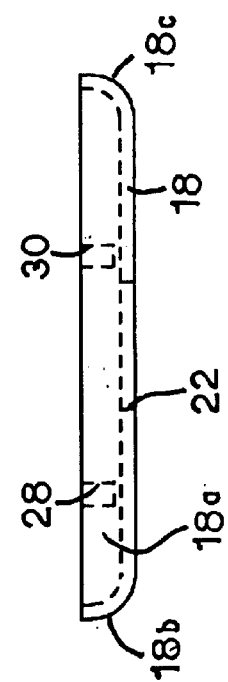
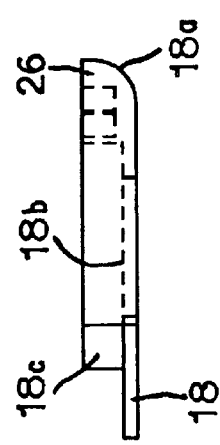

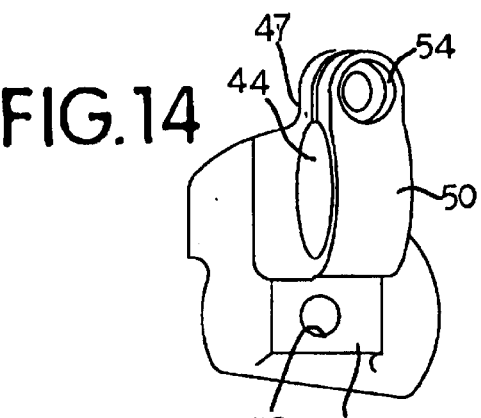
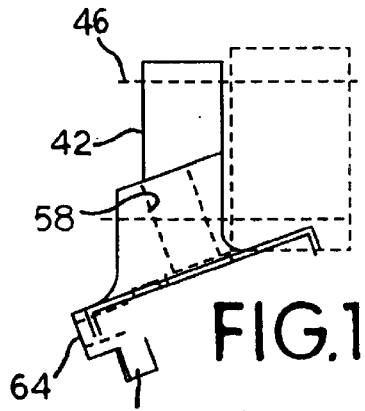
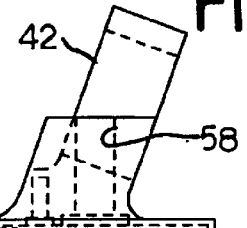
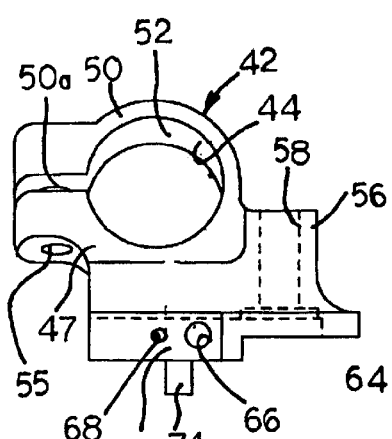
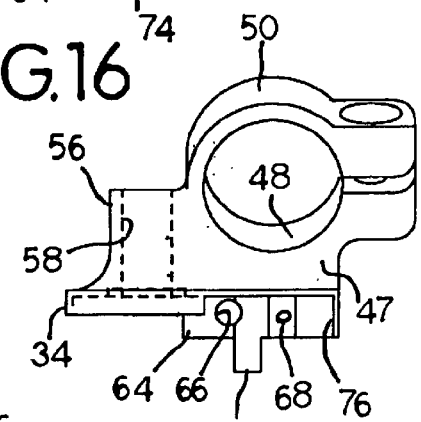
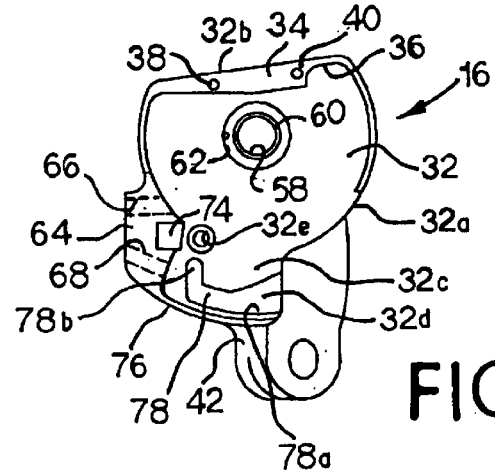

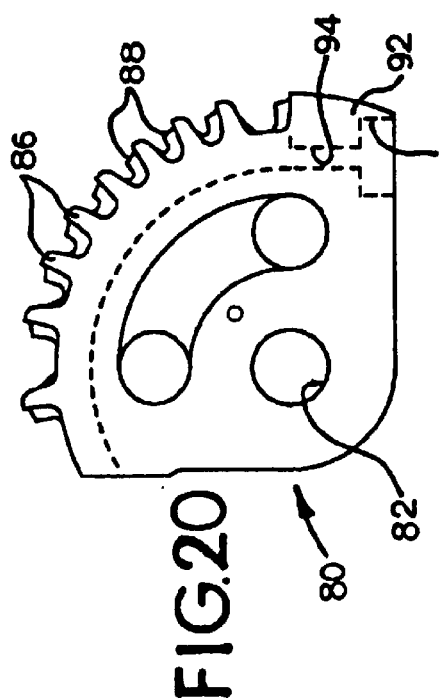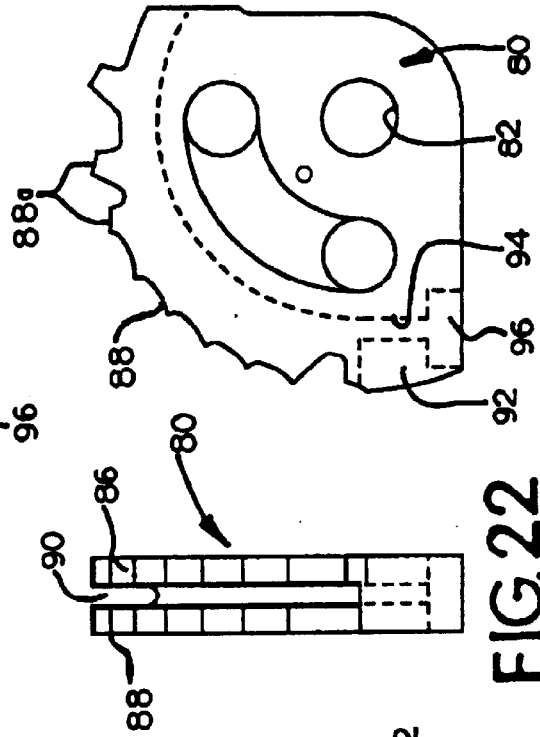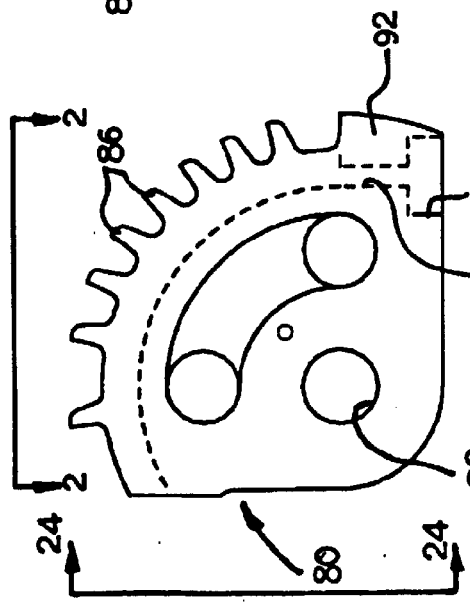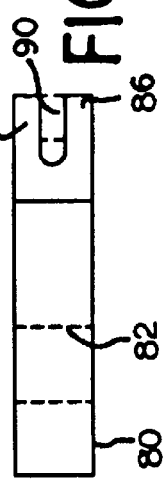

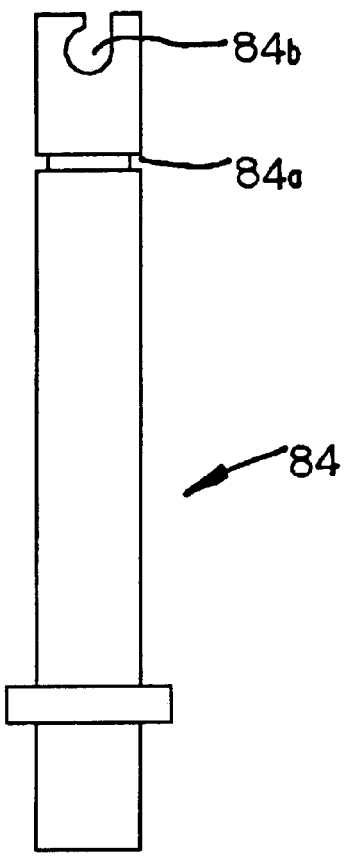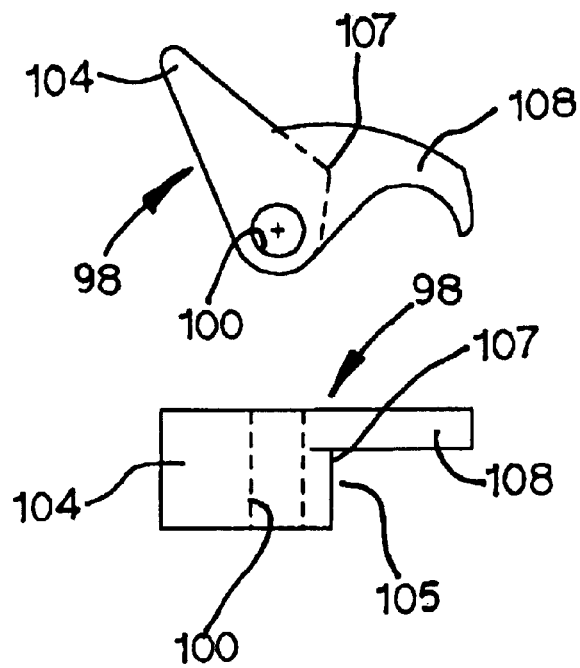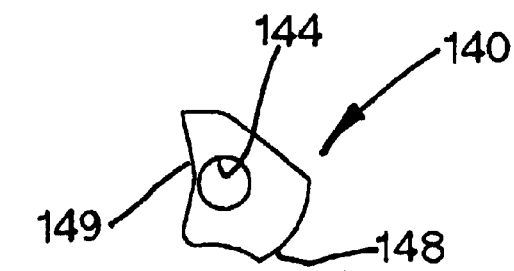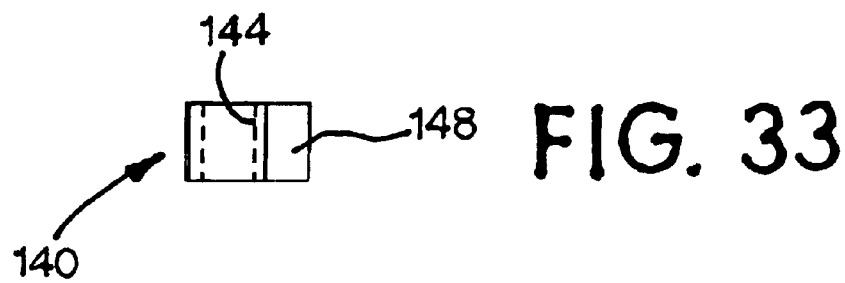

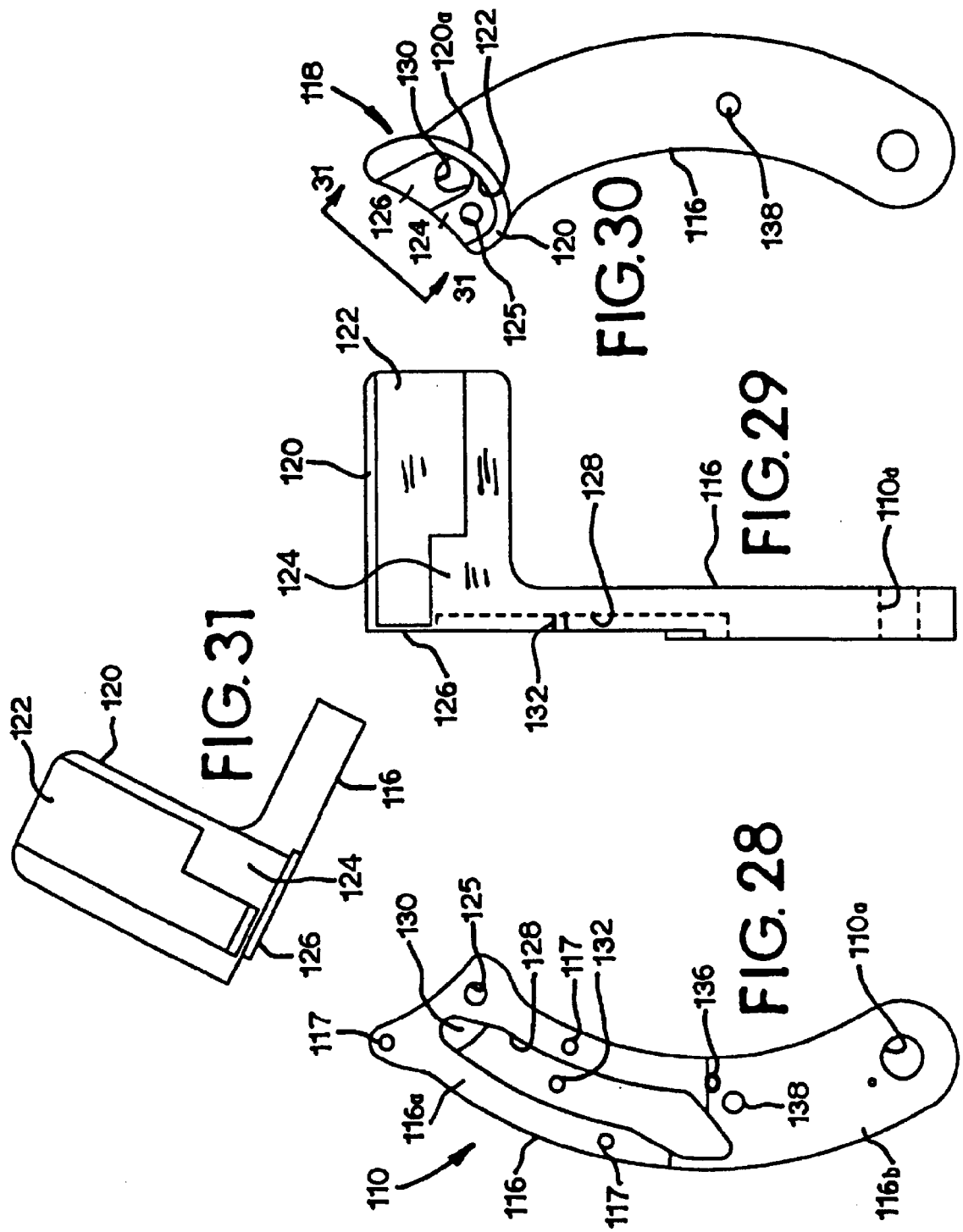

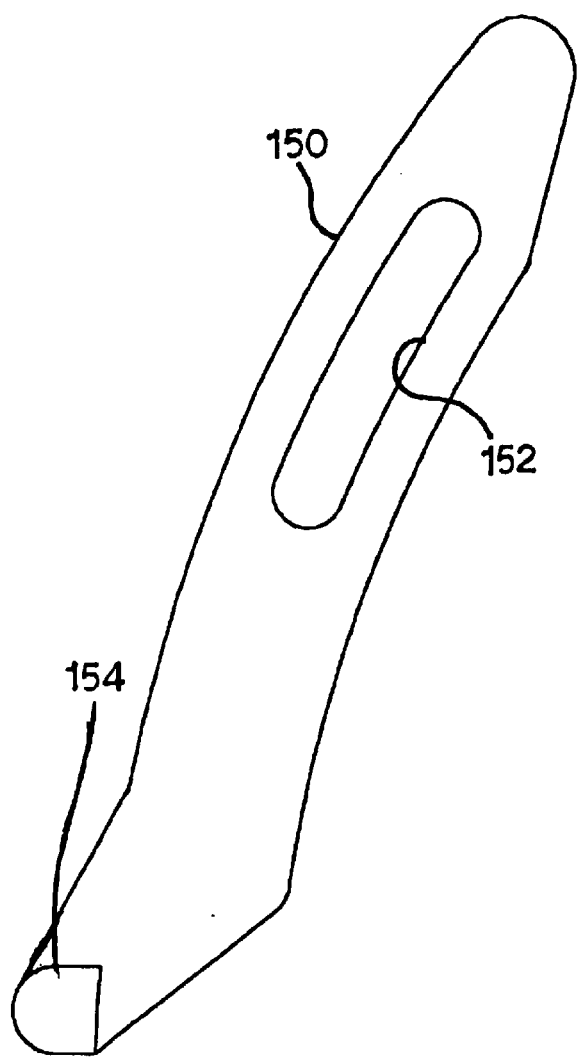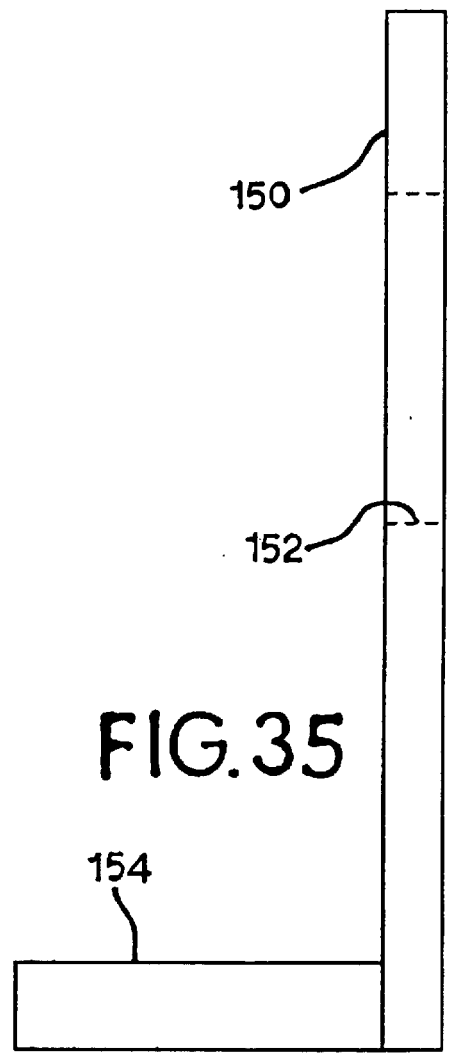

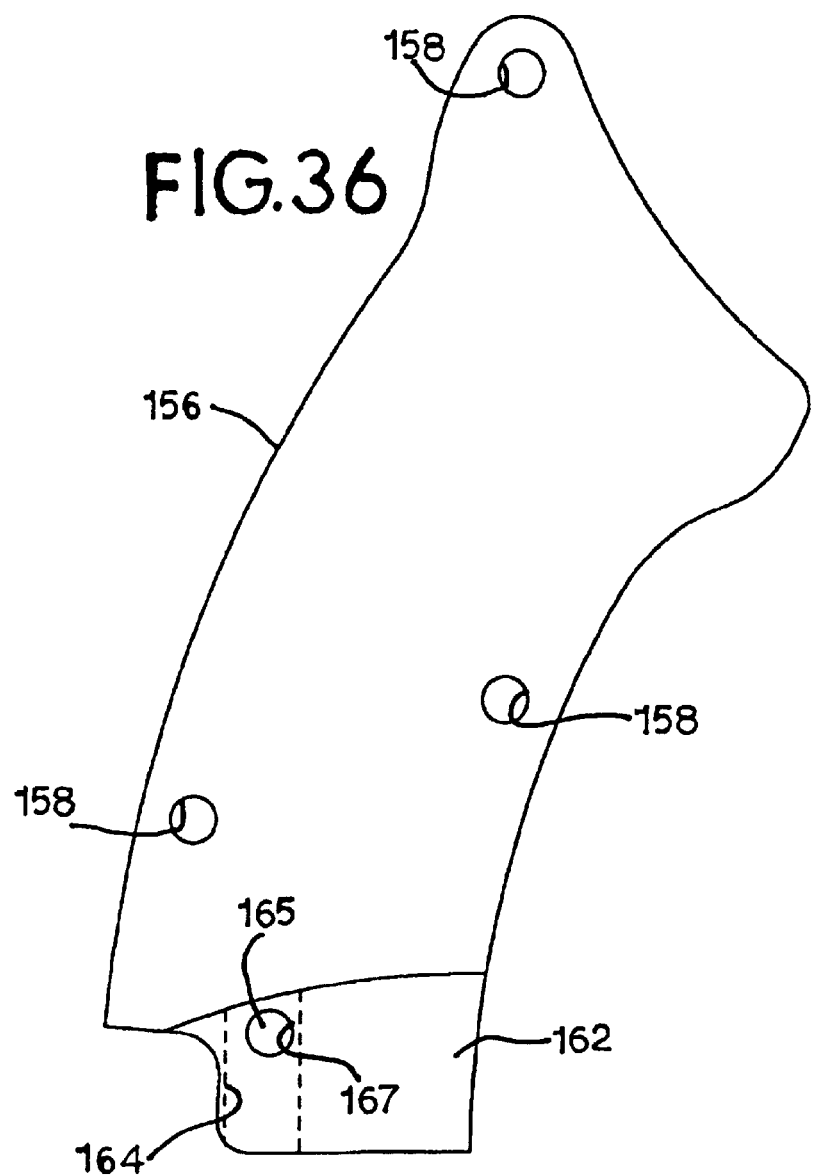
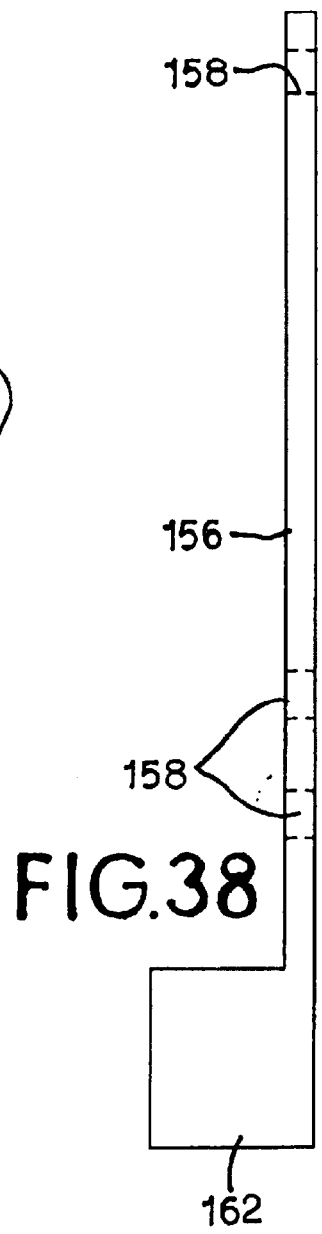
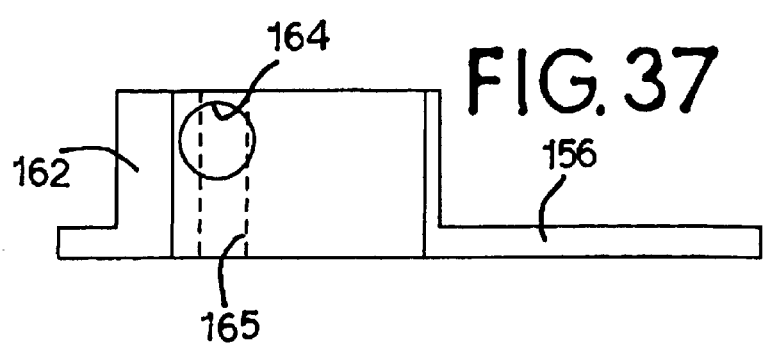

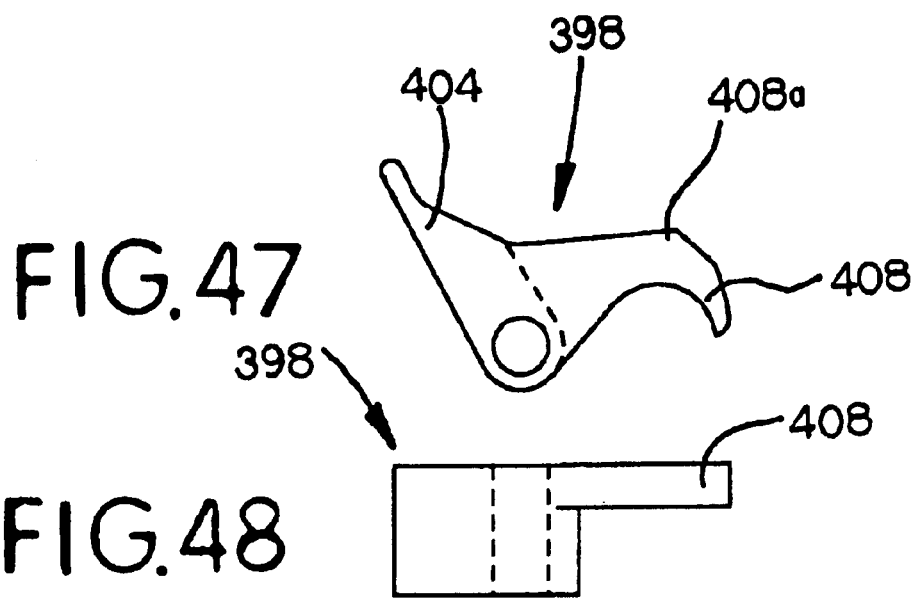
FIG. 47
FIG. 48
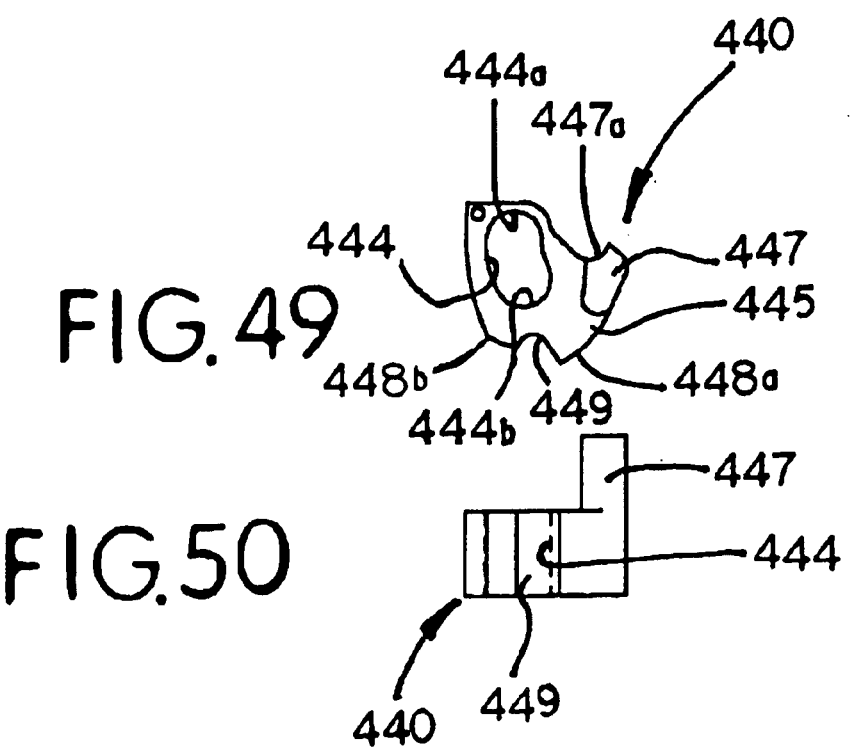
FIG. 49
FIG. 50

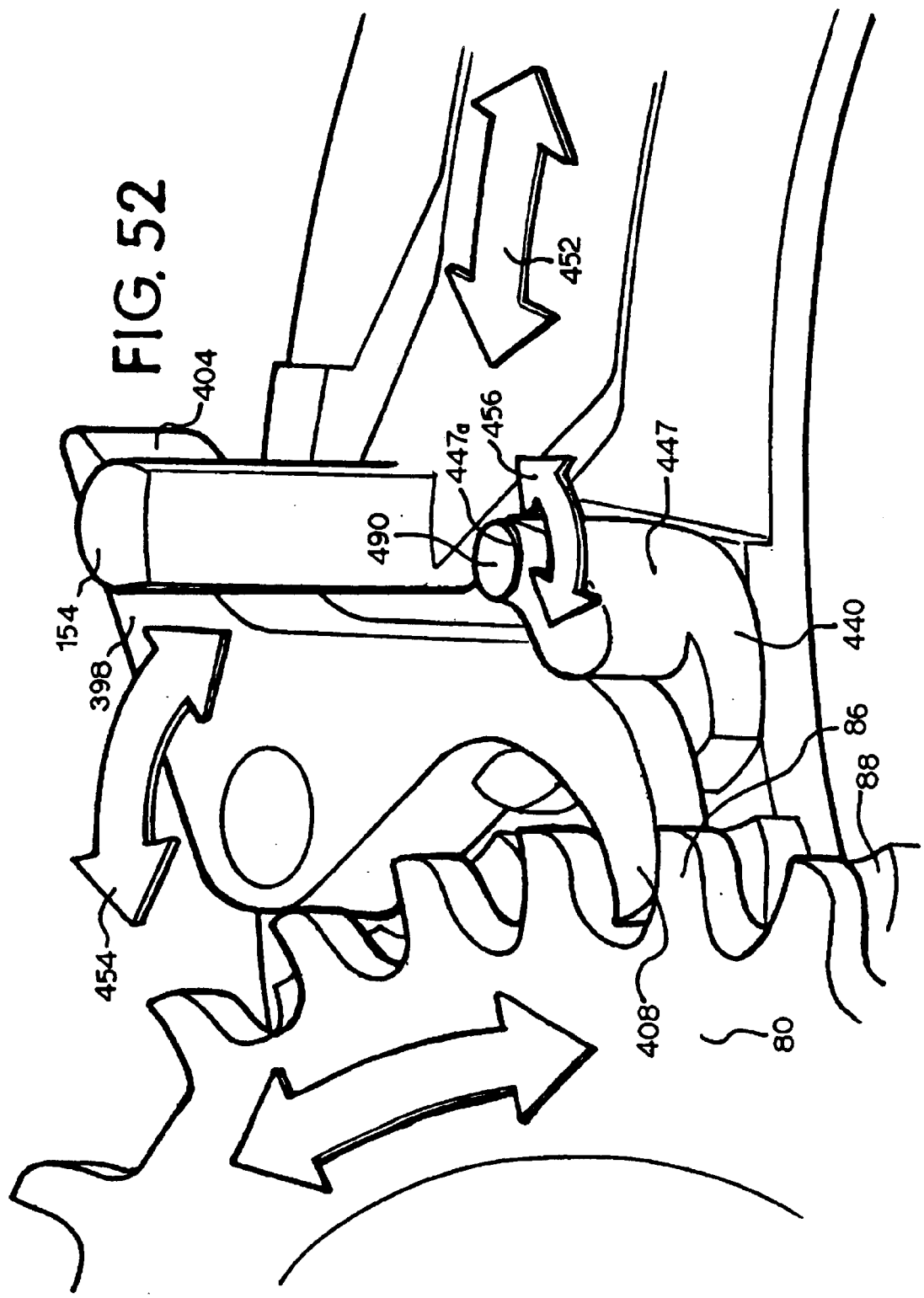

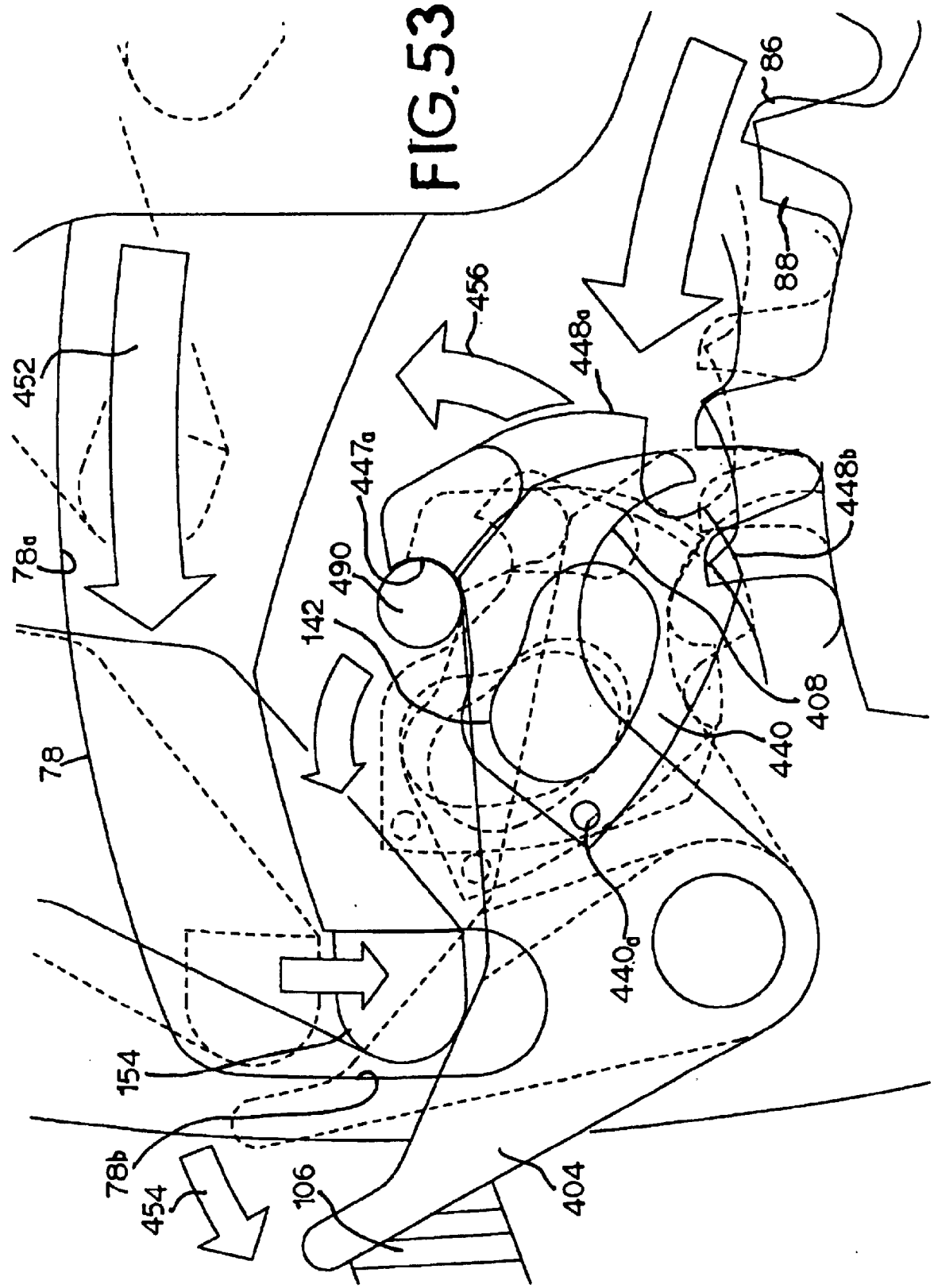

SHIFTER FOR A BICYCLE USING A DUAL ACTION LEVER WHICH MOVES IN THE SAME MOTION AS THE NATURAL MOVEMENT OF THE THUMB

REFERENCE TO RELATED APPLICATION

The present application claims priority from U.S. Provisional Application No. 60/330,282, filed Oct. 18, 2001.

BACKGROUND OF THE INVENTION

The present invention relates generally to bicycle shifters, and more particularly, is directed to a shifter for a bicycle using a dual action lever which moves in the same motion as the natural movement of the thumb.

Conventionally, shifts for bicycles have been mounted on the handlebar. However, in order to actuate the shift lever, the thumb and/or index finger must be removed from the handlebar. This severely weakens the grip and can be dangerous, for example, when riding a mountain bike over very bumpy roads and/or traveling at a high speed.

Related to this problem is the fact that conventional levers, during actuation, do not follow the natural movement of the thumb. This, again, weakens the grip.

It is therefore desirable to maintain a tight grasp with all fingers, including the thumb, on the handlebar at all times, even when shifting.

Further, many conventional shifters require the use of the index finger to actuate the lever. This, however, is the same finger used to actuate the brake lever, which is disadvantageous.

Although there are shifters that maintain the grip but change gears by rotating the grip, these are disadvantageous because they require bending of the wrist, and thereby weaken the connection to the handlebar.

OBJECTS AND SUMMARY OF THE INVENTION

Accordingly, it is an object of the present invention to provide a shifter that overcomes the problems with the aforementioned prior art.

It is another object of the present invention to provide a shifter in which there is only minimal repositioning of the hands to actuate the shift lever so that the thumb and index finger remain wrapped around the handlebar, substantially in contact therewith at all times.

It is still another object of the present invention to provide a shift in which the lever movement coincides with the natural movement of the thumb to bring the thumb in closer to the other fingers and thereby increase the grip.

It is yet another object of the present invention to provide a shift which is at the same angle to the handlebar as the thumb to mimic natural movement of the thumb.

It is a further object of the present invention to provide a shift in which the thumb reaches forward, rather than back, to activate the shift lever, and then brings the lever inwardly to tighten the grip.

It is a still further object of the present invention to provide a shift in which the thumb is brought inwardly without any restriction from other components of the bicycle.

It is a yet further object of the present invention to provide a shift in which the index finger is not used to shift.

It is another object of the present invention to provide a shift which can provide four gear shifts during one entire movement.

It is still another object of the present invention to provide a shift having a main lever for up-shifting and a spring loaded mini-lever at the end of the main lever, that is also actuated by the thumb, for down-shifting.

In accordance with an aspect of the present invention, a shift lever for a bicycle, includes a housing including a clamp head for mounting the housing on a handlebar of the bicycle and a cavity therein; a gear rotatably mounted in the cavity of the housing, the gear having a first set of teeth, the gear adapted to be connected with a biased cable; a rotatable pawl element for engaging the first set of teeth; a spring for biasing the pawl element into engagement with the first set of teeth; and a main lever mounted to the housing for rotation relative to the housing to cause a ratcheting movement of the pawl element relative to the first set of teeth during the rotation of the main lever in order to move the cable to change gears, the main lever having a thumb engaging end for engagement by a thumb of a person to effect the rotation and the main lever being positioned to have a substantially common axis of movement with a thumb of a person during a shifting operation with a person holding onto the handlebar, such that the main lever moves in a natural direction of movement of the thumb so as to tighten a grip of the person on the handlebar on which the shift lever is mounted.

The gear includes an arrangement for connecting the cable thereto. Also, the main lever is rotatably mounted to the housing relative to both the housing and the gear.

The pawl element is rotatably mounted to the housing adjacent the first set of teeth, and the main lever includes an arrangement for engaging the first set of teeth during rotation thereof to cause the ratcheting movement of the pawl element relative to the first set of teeth during the rotation of the main lever. Preferably, the arrangement includes a rotatable second pawl element mounted to the main lever for engaging the gear during movement of the main lever to cause the gear to rotate with the main lever. In such case, the gear includes a second set of teeth in spaced relation to the first set of teeth, and a recess between the first and second set of teeth for securing the cable to the gear, and the second pawl element engages the second set of teeth during rotation of the main lever to cause the gear to rotate with the main lever.

A spring is also provided for biasing the main lever to a neutral position, whereby rotation of the main lever requires a force to overcome a force imposed by the spring.

Preferably, a sweep plane of movement of the main lever lies in a range of 10 degrees to 40 degrees with respect to a line parallel to the handlebar on which the shift lever is mounted. Further, the clamp head is constructed so as to mount the shift lever to the handlebar in a manner that the common axis is located rearwardly of the handlebar and the thumb engaging end is located forwardly of the handlebar.

In accordance with an aspect of the present invention, a shift lever for a bicycle, includes a housing including a clamp head for mounting the housing on a handlebar of the bicycle and a cavity therein; a pulley/gear rotatably mounted in the cavity of the housing, the pulley/gear having a first set of teeth, a second set of teeth in spaced relation to the first set of teeth, and a recess between the first and second set of teeth for securing a biased cable thereto; a first rotatable pawl element for engaging the first set of teeth, the first pawl element being mounted to the housing; a first spring for biasing the first pawl element into engagement with the first set of teeth; a main lever mounted to the housing for rotation relative to the housing and the pulley/gear, the main lever having a thumb engaging end for engagement by a thumb of a person to effect the rotation; a second pawl element rotatably mounted at a first pivot axis for engaging the second set of teeth, the second pawl element being mounted to the main lever and being engageable by the first pawl element; a second spring for biasing the second pawl element; a slider slidably mounted on the main lever, the slider including a slider post for engagement with the first pawl element in a biased position; and a side lever pivotally mounted to the main lever for moving the slider to the biased position; whereupon for a shifting operation in a first direction, the main lever is rotated from a neutral position, whereupon the second pawl element moves away from the first pawl element and the second spring biases the second pawl element into engagement with the second set of teeth, whereby the pulley/gear rotates in a first direction with the main lever to pull the cable into the housing; and for a shifting operation in a second opposite direction, the side lever is actuated so as to move the slider to the biased position, causing the slider post to lock the main lever to the housing and to rotate the first pawl element out of engagement with the first set of teeth to permit the cable to be pulled out of the housing for a predetermined extent and thereby rotate the pulley/gear in a second, opposite direction, until the first pawl element releases the second pawl element, whereby the second spring biases the second pawl element into engagement with the second set of teeth to prevent further rotation of the pulley/gear.

A third spring is provided for biasing the slider in a direction away from the biased position. Also, the side lever is pivotally mounted to the thumb engaging end of the main lever.

A, pivot shaft is fixed to the main lever and rotatably extends through the housing and the pulley/gear, and a third spring is provided for biasing the pivot shaft, and thereby the main lever, to the neutral position.

The first pawl element includes one of a cam surface and a camming surface and the second pawl element includes the other of the cam surface and the camming surface such that engagement of the cam surface and the camming surface results in the first pawl element rotating the second pawl element out of engagement with the second set of teeth. Upon release of the side lever, the first spring biases the first pawl element such that the first pawl element provides a camming action with the second pawl element to move the second pawl element out of engagement with the second set of teeth.

Preferably, the major pawl element includes a pawl for engaging the first set of teeth, an engagement section biased by the first spring and a bore for receiving a post about which the major pawl is rotatable; and the minor pawl element includes a first pawl for engaging the second set of teeth, an engagement section biased by the second spring and a bore for receiving a post about which the minor pawl is rotatable.

In one embodiment, the bore of the second element is formed as an elongated slot, and the second pawl element includes a second pawl for engaging the second set of teeth, such that for the shifting operation in the second opposite direction, the second pawl element moves in a rotating and sliding movement, with the first pawl of the second pawl element initially engaging the second set of teeth and then being moved away from the second set of teeth by the first pawl element which causes the second pawl element to rotate and slide about a different pivot axis. Preferably, the second pawl element includes an upstanding post which is engaged by the first pawl element for rotating and sliding the second pawl element.

In all of the embodiments, the first pawl element includes a cut away portion such that the pawl thereof is raised, and the second pawl element is positioned in the cut away portion below the raised pawl of the first pawl element.

The main lever has a recess and the slider is slidably mounted in the recess.

An arrangement is also provided in the housing for engagement with the side lever when the slider is moved by the side lever so as to prevent rotation of the main lever. The side lever is also rendered ineffectual upon rotation of the main lever.

In accordance with still another aspect of the present invention, a shift lever for a bicycle having a drive train, includes a housing including a clamp head for mounting the housing on a handlebar of the bicycle at a remote location from the drive train, the housing having a cavity therein; a mechanism in the housing for controlling actuation of the drive train; a main lever mounted to the housing for rotation relative to the housing, the main lever having a thumb engaging end for engagement by a thumb of a person to effect the rotation and the main lever being associated with the mechanism to activate the mechanism to control actuation of the drive train in a first direction; a side lever pivotally mounted to the main lever for engagement by a thumb of a person and being associated with the mechanism to activate the mechanism to control actuation of the drive train in a second, opposite direction.

The mechanism is one of the following a) a pneumatic valve, b) a hydraulic piston, and c) an electric switch.

The above and other objects, features and advantages of the invention will become readily apparent from the following detailed description thereof which is to be read in connection with the accompanying drawings.

BRIEF DESCRIPTION OF THE DRAWINGS

FIG. 10 is a top plan view of the lower housing;

FIG. 11 is a side elevational view of the lower housing, viewed along one short side edge;

FIG. 12 is a side elevational view of the lower housing, viewed along one long side edge;

FIG. 13 is a side elevational view of the lower housing, viewed along the other short side edge;

FIG. 14 is a top plan view of the upper housing;

FIG. 15 is an inner end elevational view of the upper housing;

FIG. 16 is a rear elevational view of the upper housing;

FIG. 17 is an outer end elevational view of the upper housing;

FIG. 18 is a bottom plan view of the upper housing;

FIG. 19 is a rear elevational view of the upper housing, shown secured on a handlebar;

FIG. 20 is a top plan view of the pulley/gear;

FIG. 21 is a top plan view of the pulley/gear with the second set of teeth removed for better clarity of the first set of teeth;

FIG. 22 is an end elevational view of the pulley/gear, viewed along line 22—22 of FIG. 21;

FIG. 23 is a bottom plan view of the pulley/gear with the first set of teeth removed for better clarity of the second set of teeth;

FIG. 24 is an end elevational view of the pulley/gear, viewed along line 24—24 of FIG. 21;

FIG. 25 is an elevational view of the pivot shaft;

FIG. 26 is a top plan view of the major pawl element;

FIG. 27 is an elevational view of the major pawl element;

FIG. 28 is a top plan view of the main lever;

FIG. 29 is a side elevational view of the main lever;

FIG. 30 is a bottom plan view of the main lever;

FIG. 31 is an end elevational view of the main lever, viewed along line 31—31 of FIG. 30;

FIG. 32 is a top plan view of the minor pawl element;

FIG. 33 is an elevational view of the minor pawl element;

FIG. 34 is a top plan view of the slider plate;

FIG. 35 is a side elevational view of the slider plate;

FIG. 36 is a top plan view of the cover plate;

FIG. 37 is an end elevational view of the cover plate;

FIG. 38 is a side elevational view of the cover plate;

FIG. 47 is a top plan view of a major pawl element according to another embodiment of the present invention;

FIG. 48 is a side elevational view of the major pawl element of FIG. 47;

FIG. 49 is a top plan view of a minor pawl element for use with the major pawl element of FIG. 47;

FIG. 50 is a side elevational view of the minor pawl element of FIG. 49;

FIG. 52 is an enlarged perspective view of a portion of the shift lever of FIG. 51, to show operation thereof; and FIG. 53 is a top plan view of the portion of the shift lever of FIG. 52, to show operation thereof.

DETAILED DESCRIPTION

Figure 1:
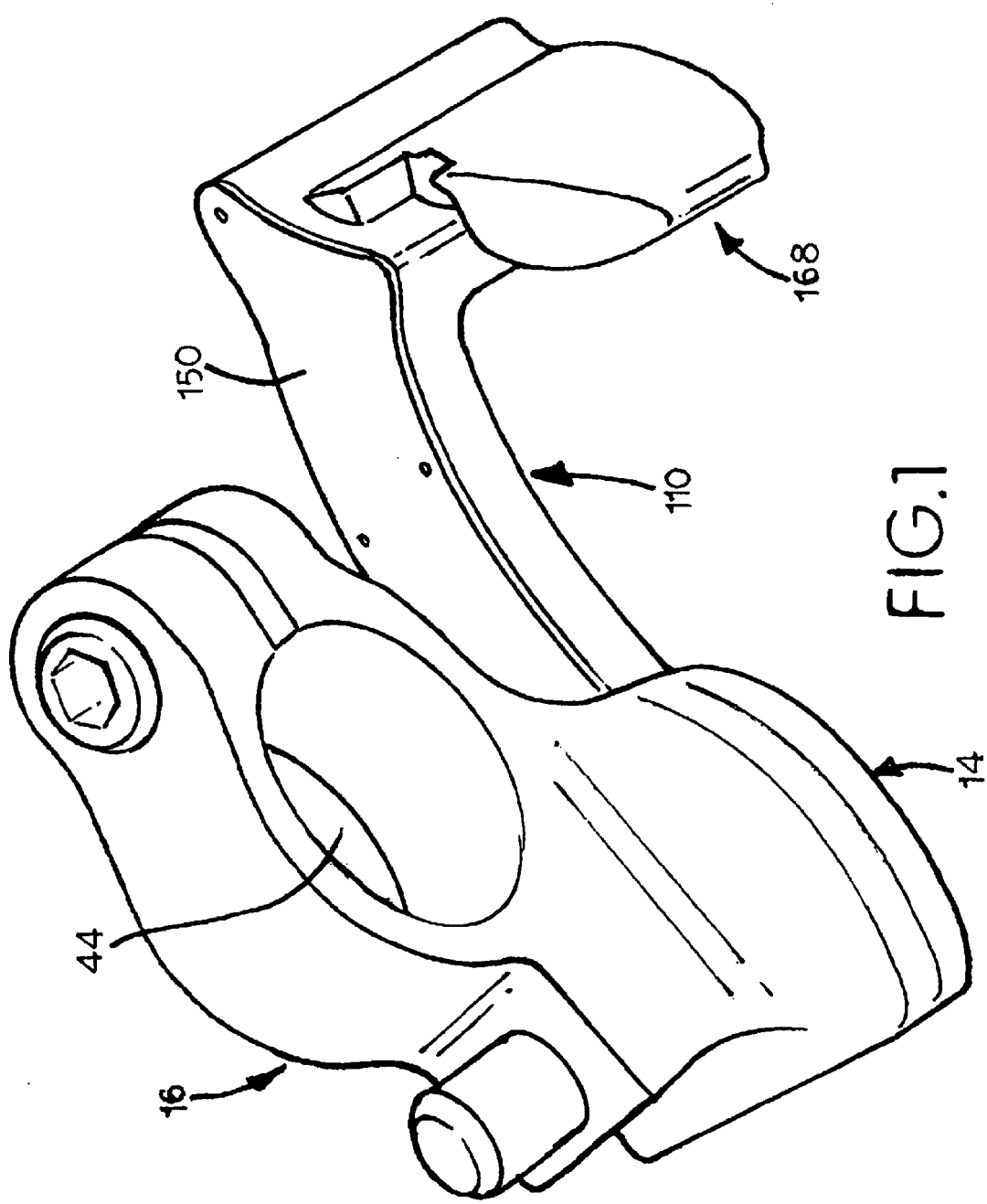
FIG. 1 is a first perspective view of a right hand shifter according to the present invention, viewed from the top and the outer end of the handlebar when mounted thereon.
Figure 2:
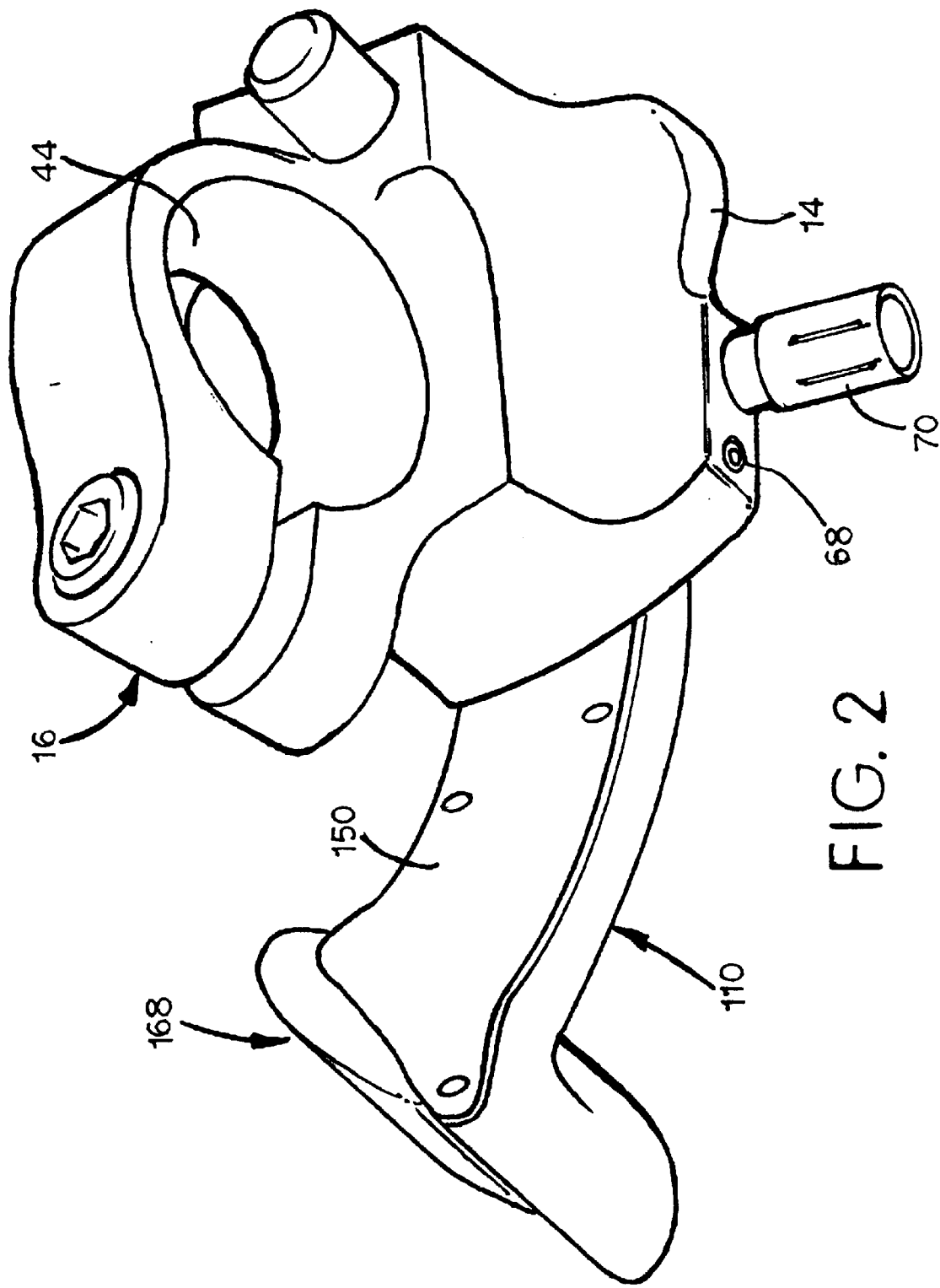
FIG. 2 is a second, different perspective view of the shifter, viewed from the top and the inner end of the handlebar when mounted thereon.

Referring to the drawings in detail, a shift lever 10 according to the present invention, to be mounted on the handlebar 46 of a bicycle, includes a housing 12 comprised of a lower housing 14 and an upper housing 16 for housing the components of shift lever 10.

Specifically, as shown in FIGS. 9–13, lower housing 14 includes a flat plate 18 having a generally rectangular configuration, with a first lengthwise edge 18a, second and third slightly arcuate widthwise edges 18b and 18c and a fourth lengthwise edge 18d. Because edge 18b is slightly greater in length than edge 18c, fourth lengthwise edge 18d is cut-away at 20 to meet with edge 18c. A circular opening 22 is provided substantially centrally of plate 18, and is provided at one circumferential portion with a slightly offset tab opening 24 in communication therewith. A raised ledge 26 extends upwardly along the entire length of edges 18a and 18c, and part of the way along edge 18b. Ledge 26 increases in width from edge 18b to edge 18c, and then drastically reduces in width immediately before edge 18c, to form a recess 27. Two spaced apart circular bores 28 and 30 are provided in the upper surface of the portion of ledge 26 that extends along edge 18a.

As shown in FIGS. 9 and 14–19, upper housing 16 includes a part-circular flat plate 32 with a generally arcuate outer edge 32a and a generally linear outer edge 32b that connects with opposite ends of outer edge 32a. Outer edge 32b has the same dimensions and shape as edge 18a, and arcuate outer edge 32a has the same curvature as edges 18b and 18c. A raised ledge 34 extends downwardly along the entire length of edge 32b and part of the way along edge 32a. Ledge 34 increases in width along edge 32b, from one end of edge 32a to the other end thereof, and then drastically reduces in width immediately before one end thereof, to form a recess 36. Two spaced apart circular bores 38 and 40 are provided in the upper surface of the portion of ledge 34 that extends along edge 32b. In this manner, when lower housing 14 and upper housing 16 are assembled together, ledges 26 and 34, which are of the same dimensions and shape, abut against each other to define a hollow cavity therebetween, and with bores 28 and 38 and bores 30 and 40 being in alignment. Pins (not shown) can be placed within the respective bores to maintain lower housing 14 and upper housing 16 in alignment with and secured to each other.

In addition, plate 32 includes an outward extension 32c near the center of arcuate outer edge 32a, with outward extension 32c having a guide surface 32d on the radially outer surface thereof.

Upper housing 16 further includes a clamp head 42 mounted at an inclination to the upper surface of plate 32. Clamp head 42 includes a circular opening 44 for receiving the handlebar 46 therein. Specifically, clamp head 42 includes a lower clamp arm 47 having a lower semi-circular recess 48, and an upper clamp arm 50 having an upper semi-circular recess 52, with recesses 48 and 52 forming circular opening 44. The free end of upper clamp arm 50 has a bore 50a in alignment with a threaded opening 55 in a free end of lower clamp arm 48, through which a bolt 54 extends for tightening clamp head 42 on handlebar 46.

Clamp head 42 includes a raised extension 56 on the opposite side of circular opening 44, which extends upwardly from the upper surface of plate 32. A through bore 58 extends entirely through plate 32 and raised extension 56, the purpose for which will be apparent from the discussion which follows. A hollow cylindrical stub member 60 is force fit within bore 58 to provide better resistance against abrasion of bore 58, with stub member 60 being substantially flush with the lower surface of plate 32. A shallow annular recess 62 is formed in the lower surface of plate 32 around bore 58, and is coaxial therewith.

Upper housing 16 further includes a cable receiving section 64 at the periphery of plate 32 and at one end of raised ledge 34. Cable receiving section 64 extends downwardly past the lower edge of ledge 34 and includes a threaded cable receiving through bore 66 and another threaded bore 68 adjacent thereto. A cable housing 70 that slidably houses a cable (not shown) is threaded into cable receiving through bore 66 such that the cable extends into the cavity defined between lower housing 14 and upper housing 16. A set screw 72 is threaded into the other threaded bore 68. A post 74 extends downwardly from the lower surface of cable receiving section 64, the purpose for which will become apparent from the description which follows. Plate 32 also includes a bore 32e adjacent the inner surface of cable receiving section 64 at a position between bores 66 and 68.

A thin guide wall 76 extends downwardly from the lower surface of that portion of lower clamp arm 47 that extends outwardly of plate 32, with guide wall 76 being in spaced relation from guide surface 32d so as to define an inverted L-shaped guide track 78 having a long section 78a and a transverse short section 78b.

Referring now to FIGS. 9 and 20–24, a sector shaped pulley/gear 80 is positioned in the cavity between lower housing 14 and upper housing 16. Sector shaped pulley/gear 80 has a through bore 82 that is aligned with bores 22 and 58, with a pivot shaft 84 (FIG. 25) extending through bores 22, 58 and 82 in order to permit pulley/gear 80 to rotate within the cavity. Sector shaped pulley/gear 80 includes a first set of teeth 86 arranged along an arcuate peripheral surface thereof, and a second set of teeth 88 arranged along the arcuate peripheral surface in parallel, spaced apart relation from first set of teeth 86, so as to form an arcuate recess 90 therein. One end of arcuate recess 90 is closed by a wall 92 having an opening 94 therein that leads to an enlarged recess 96. When pulley/gear 80 is assembled in the cavity between lower housing 14 and upper housing 16, the cable that extends through threaded cable receiving through bore 66, also extends within arcuate recess 90. The end of the cable has an enlarged head (not shown) which is captured on the opposite side of wall 92 in enlarged recess 96. As a result, when sector shaped pulley/gear 80 is rotated in a direction away from threaded cable receiving through bore 66, it pulls the cable therewith in order to change gears on the derailleur. When sector shaped pulley/gear 80 is released from any external force, the spring force on the cable, from the derailleur, pulls the cable back, and thereby rotates sector shaped pulley/gear 80 in the opposite direction.

Second set of teeth 88 are shallower than first set of teeth 86, and are generally oriented in an opposite direction therefrom, the reason for which will become apparent from the discussion which follows. As appreciated from the drawings, second set of teeth 88 have different profiles from first set of teeth 86 due to the different directions, different locations of the pawls and different manners of engagement. The upper arcuate surface 88a of each tooth of second set of teeth 88 forms the engaging surface thereof.

Figure 9:
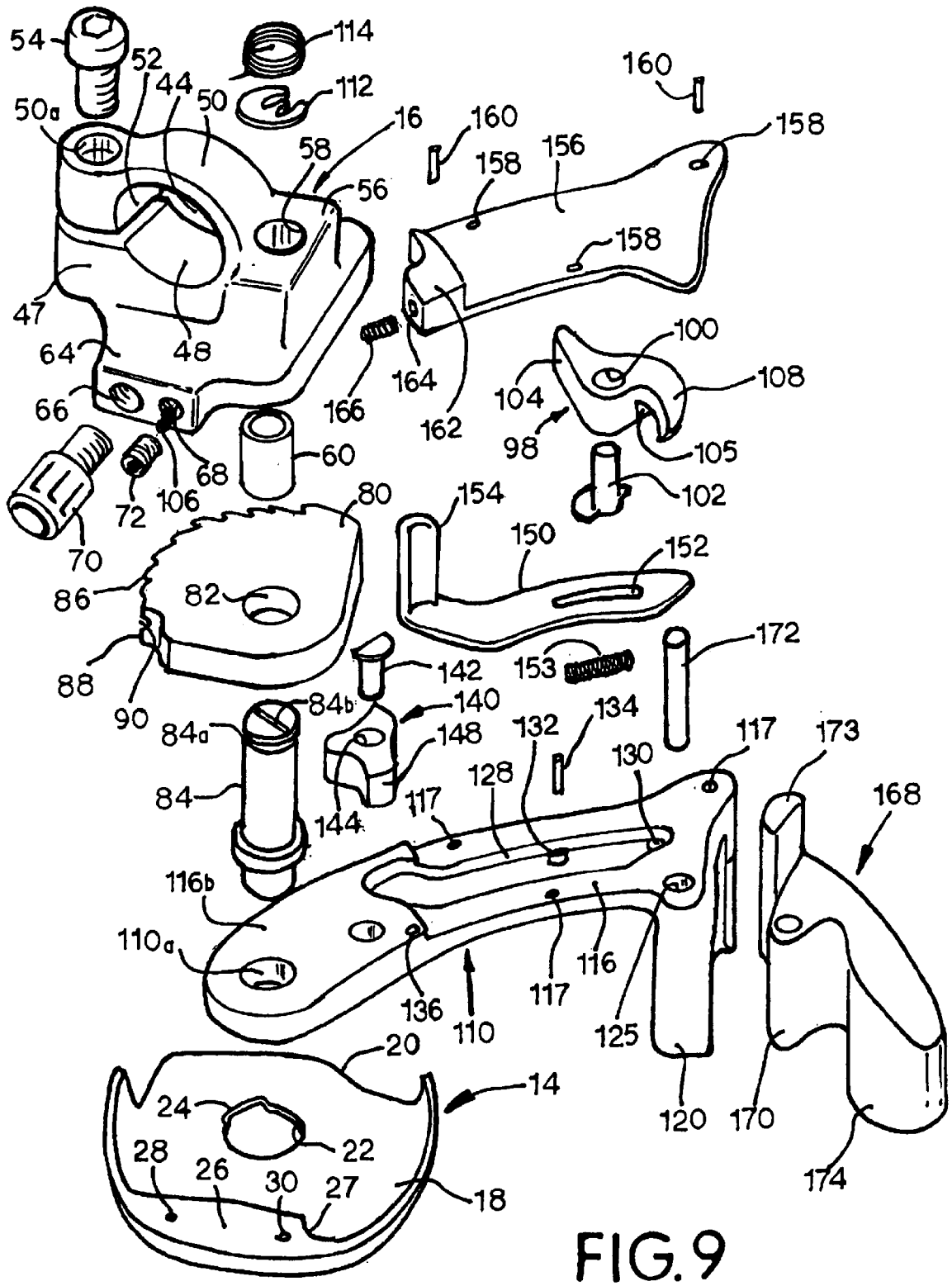
FIG. 9 is an exploded perspective view of the shifter.
Figure 39:
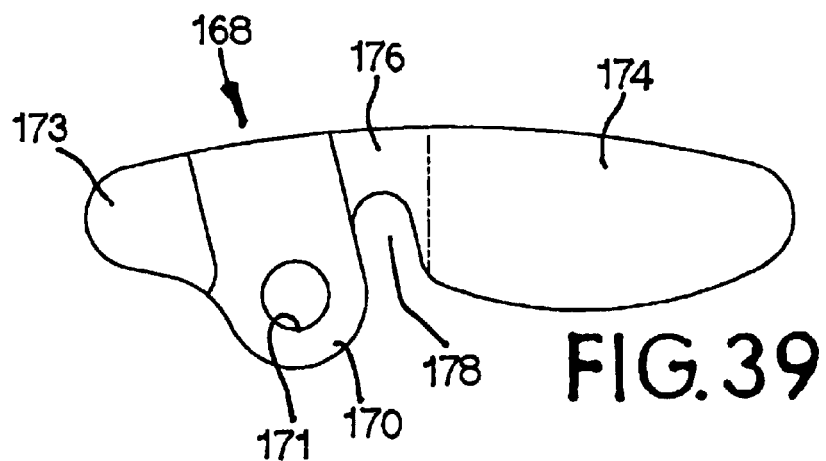
FIG. 39 is a top plan view of the side lever.
Figure 40:
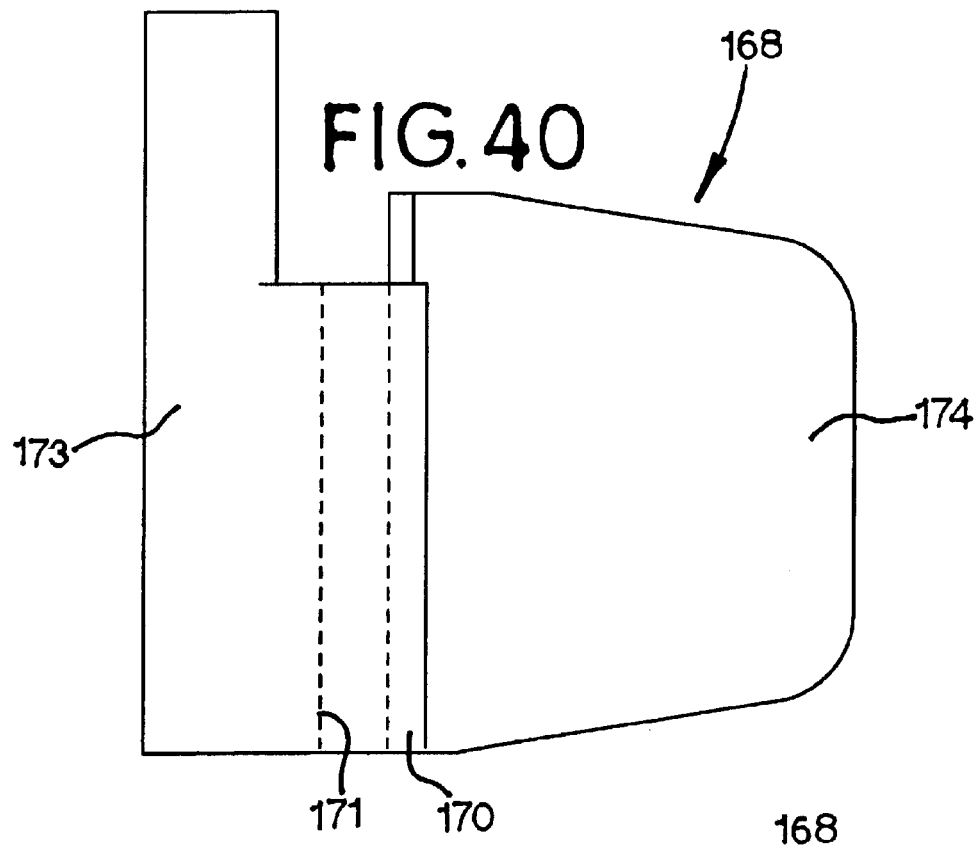
FIG. 40 is a side elevational view of the side lever.
Figure 41:
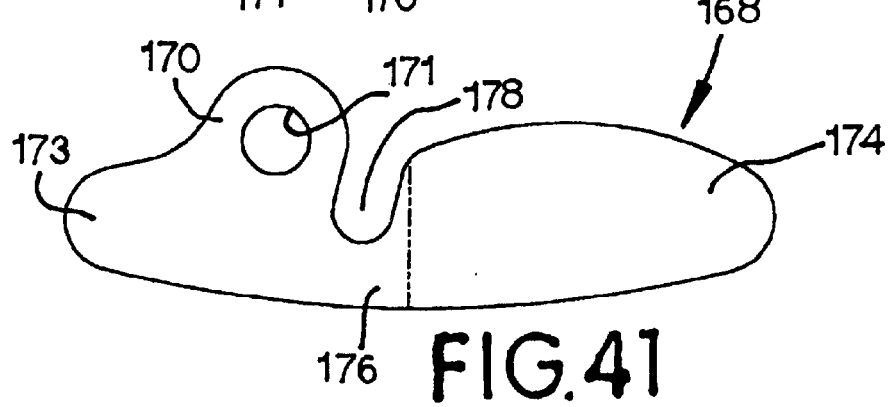
FIG. 41 is a bottom plan view of the side lever.

As shown in FIGS. 9, 26 and 27, a major pawl element 98 has a through bore 100 so as to be rotatably mounted on a major pawl post 102 which is secured in bore 32e of upper housing 16. Major pawl element 98 includes an engagement arm 104 to one side of through bore 100 and a raised pawl 108 to another side of through bore 100. Specifically, a lower portion of major pawl element 98 is cut away at 105 so that pawl 108 is raised in order to engage only first set of teeth 86. The cut away portion 105 is such that an apex or cam 107 is defined thereby. A coil spring 106 is positioned in threaded bore 68 of cable receiving section 64 and set screw 72 is threaded therein. Thus, coil spring 106 is trapped between set screw 72 and engagement arm 104 for biasing major pawl element 98 such that raised pawl 108 is normally biased into engagement with first set of teeth 86.

Referring now to FIGS. 9 and 28–31, a main lever 110 has a circular opening 110a in which the lower end of pivot shaft 84 is fixed, main lever 110 being positioned below lower housing 14 for rotation with pivot shaft 84. The upper end of shaft 84 has a circumferential groove 84a therein and a C-clip 112 is positioned therein to lock pivot shaft 84 in position, while permitting rotation thereof. A coil spring 114 is wrapped about the upper end of pivot shaft 84 and sits on C-clip 112. The lower end 114a of coil spring 114 abuts against upper clamp arm 50, while the upper end 114b of coil spring 114 is force fit into a slot 84b formed in the upper surface of pivot shaft 84. In this manner, spring 114 applies a counter-clockwise force on main lever 110 until main lever 110 is stopped by abutment post 74 on upper housing 16.

Main lever 110 includes an elongated slightly arcuate arm 116 having circular opening 110a in the upper surface at one end thereof, and terminates in a thumb actuator section 118 at the end thereof opposite circular opening 110a. Thumb actuator section 118 is parallel with pivot shaft 84 but extends in the opposite direction therefrom. As will be apparent from the discussion which follows, when a person's thumb engages thumb actuator section 118 to pivot main lever 110 and thereby actuate a gear shift, the person's thumb moves inwardly to tighten the grip of the person on handlebar 46 and also moves in a direction in line with the thumb's natural movement.

Thumb actuator section 118 is formed as an arcuate wall 120 such that the bowed outer surface 120a thereof, which faces inwardly of main lever 110, is engaged by the thumb of a person during actuation. As a result of the arcuate wall 120, there is an concave arcuate outer facing recess 122 which is partially closed at an upper end to one side thereof by a partial closing wall 124 and which is partially covered at its upper end by an upper closing wall 126.

An elongated recess 128 is formed in the upper surface of arcuate arm 116, the outer end of which has an opening 130 in the bottom wall thereof which opens into arcuate outer facing recess 122. The upper surface 116a of arcuate arm 116 surrounding recess 128 is lower than the upper surface 116b inwardly of recess 128, as will be understood from the discussion hereafter. A pin 132 extends upwardly from a center portion of elongated recess 128 to function as a guide and a spring stop, as will be appreciated from the discussion hereafter. The upper end of pin 132 is flush with the upper surface of arcuate arm 116. A stop pin 134 (FIG. 9) is also force fit in a circular recess 136 at the upper surface of arcuate arm 116 immediately adjacent the inner end of elongated recess 128, the purpose for which will become apparent from the discussion which follows.

A circular opening 138 is formed in the upper surface of arcuate arm 116 immediately inwardly of pin 134, and a minor pawl element 140 is rotatably mounted to the upper surface of arcuate arm 116 on a minor pawl post 142 which is force fit in opening 138.

As shown in FIGS. 9, 32 and 33, minor pawl element 140 includes a through bore 144 so as to be rotatably mounted on minor pawl post 142. In the assembled condition, minor pawl element 140 is positioned in cut away section 105 of major pawl element 98. Minor pawl element 140 includes a pawl 148 at one side for engaging with upper arcuate surfaces 88a of second set of teeth 88, and a recessed camming surface 149 on another side. Pawl 148 is formed by an arcuate surface which engages the upper arcuate surface 88a of each tooth of second set of teeth 88.

Referring now to FIGS. 9, 34 and 35, a slider plate 150 is slidably positioned in elongated recess 128 for lengthwise sliding movement therein. Slider plate 150 includes an elongated opening 152 that receives pin 132 for sliding therealong. The upper surface of slider plate 150 is flush with the upper surface 116a of arcuate arm 116. A coil spring 153 is positioned in elongated opening 152 between the outer end of opening 152 and pin 132 to normally bias slider plate 150 outwardly of main lever 110. An upstanding slider post 154 extends from the upper surface of slider plate 150 at the inner end thereof, and in the assembled condition, fits and rides within inverted L-shaped guide track 78 of upper housing 16.

As shown in FIGS. 9 and 36–38, a cover plate 156 mounts on and is in covering relation to the entire upper surface 116a so that the upper surface of cover plate 156 is flush with the remaining upper surface 116b of arcuate arm 116. In this regard, cover plate 156 has the identical dimensions to upper surface 116a. It will be appreciated that, in this arrangement, elongated slot 128 extends slightly past cover plate 156 and upper surface 116a into upper surface 116b so as to permit upstanding slider post 154 to move back and forth with movement of slider plate 150. Cover plate 156 has openings 158 corresponding in position to openings 117 in upper surface 116a in surrounding relation to recess 128, and pins 160 are positioned within openings 117 and 158 to secure cover plate 156 to arcuate arm 116.

Cover plate 150 includes a spring housing 162 extending upwardly therefrom at the inner end thereof. Spring housing 162 includes an inner side opening 164 that houses a coil spring 166 (FIG. 9) for engaging minor pawl element 140 to bias minor pawl element 140 into engagement with second set of teeth 88. One end of coil spring 166 is restrained by a post 165 in an opening 167 of spring housing 162.

A side lever 168 is provided for actuating shifting in the opposite direction as main lever 116. Side lever 168 includes a pivoting section 170 positioned within arcuate outer facing recess 122 of main lever 110 and which is pivotally mounted on a pin 172 that extends through an opening 125 in partial closing wall 124 of arcuate arm 116 and through a bore 171 in pivoting section 170. Pivoting section 170 includes an engagement end 173 that functions to move slider plate 150 and to limit the clockwise pivoting movement of side lever 168. Side lever 168 also includes a thumb actuating section 174 connected by a thin wall 176 to pivoting section 170 such that an indent area 178 is formed for receiving arcuate wall 120 and limiting counter-clockwise movement of side lever 168. Thumb actuating section 174 extends outwardly in a substantially transverse direction in relation to the lengthwise direction of arcuate arm 116. Side lever 168 is intended to be actuated by the thumb in a reverse direction from the direction of actuation of main lever 116.

Figure 42:
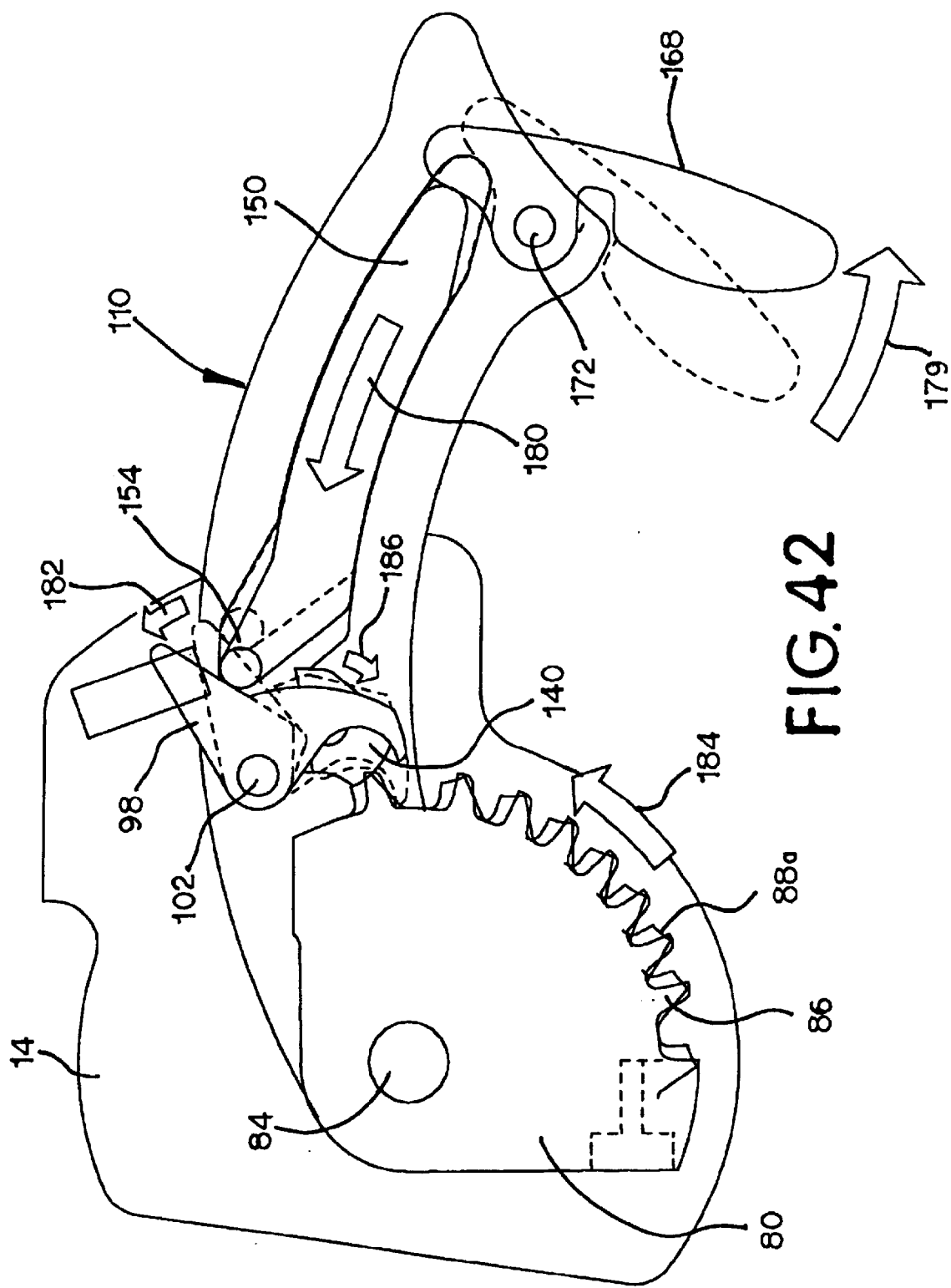
FIG. 42 is a plan view of the shift lever, with the cover plate and upper housing removed, to show operation thereof.
Figure 43:
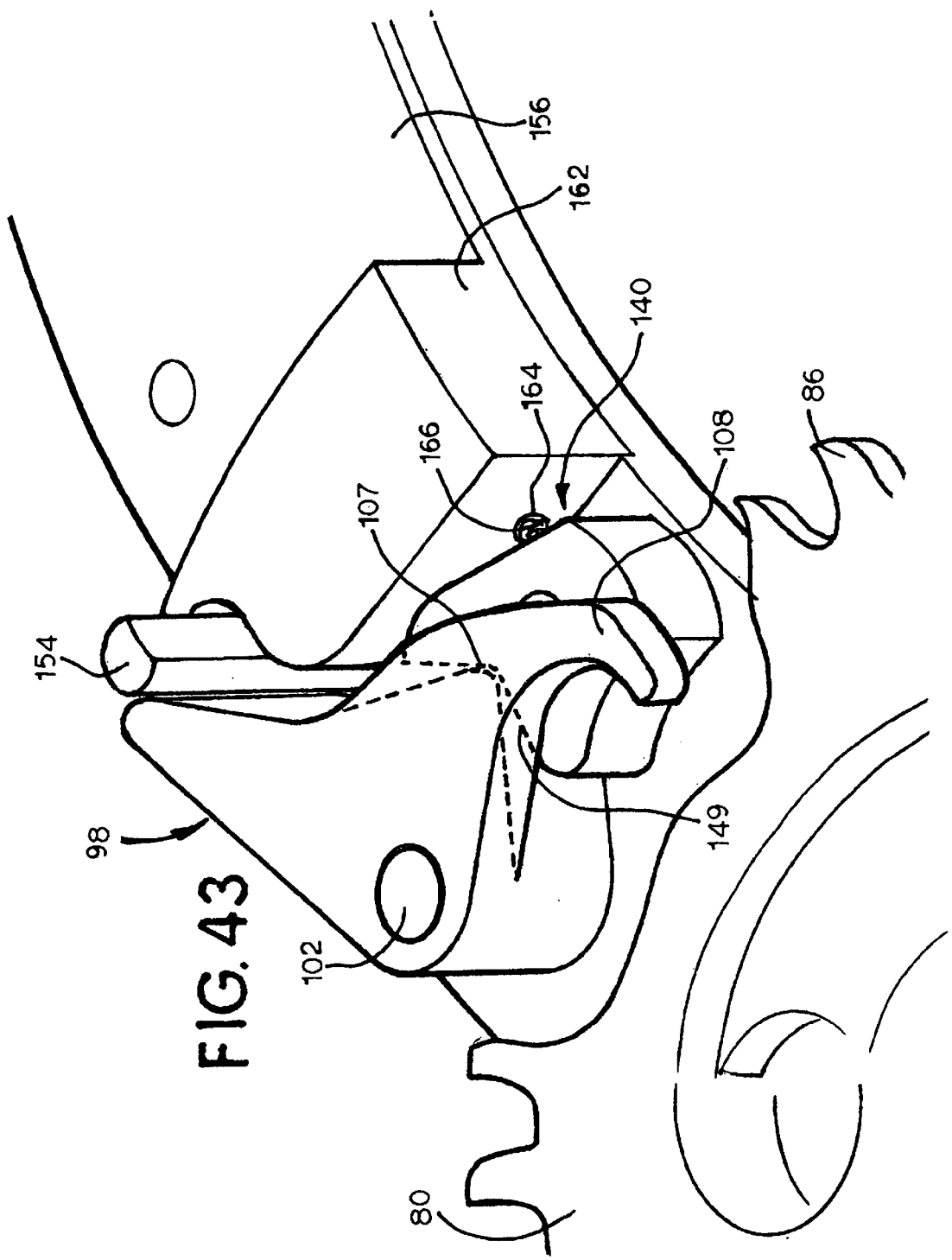
FIG. 43 is an enlarged perspective view of a portion of the shift lever, with the pulley/gear cut away, to show operation thereof.
Figure 44:
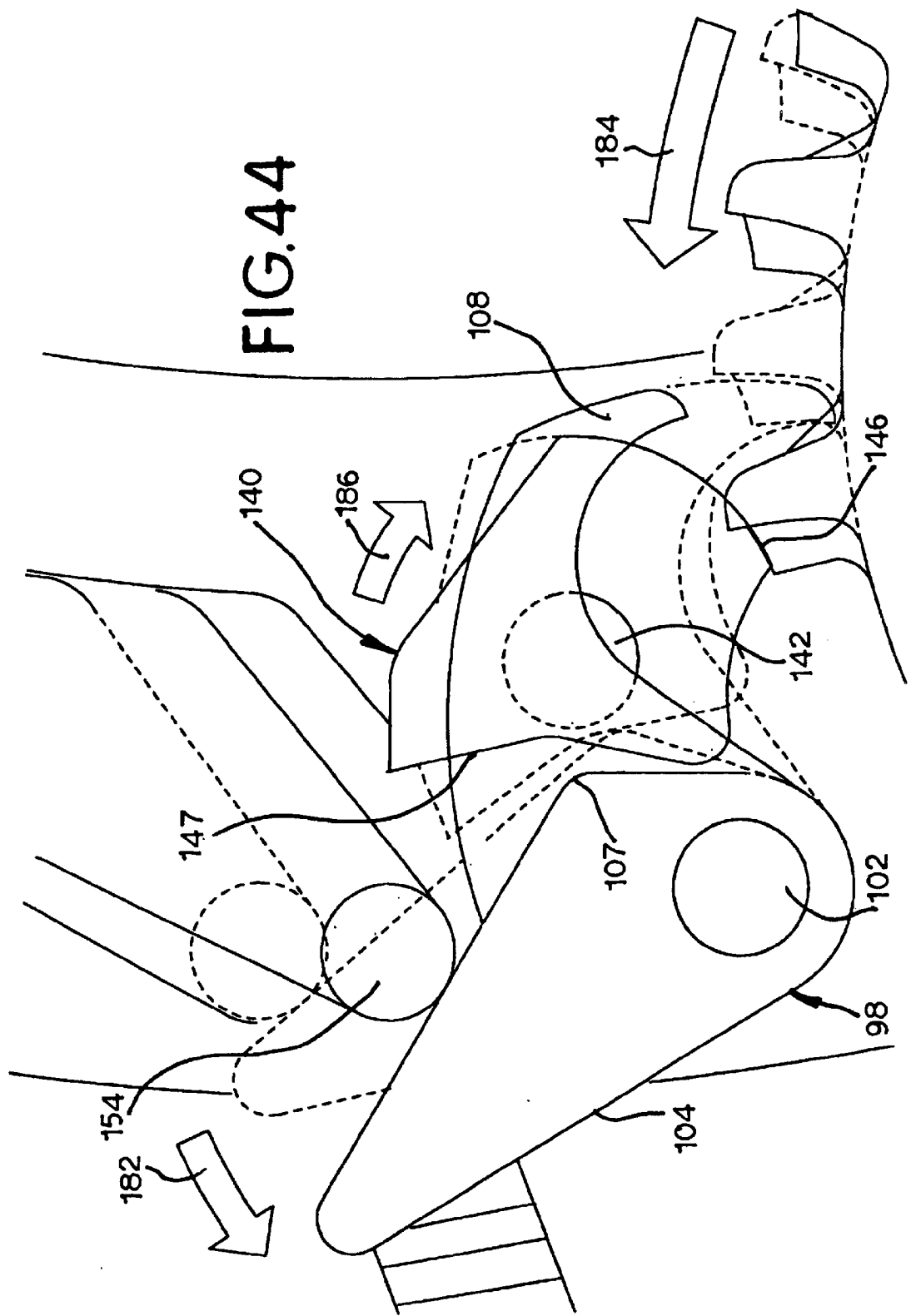
FIG. 44 is an enlarged top plan view of a portion of the shift lever, to show operation thereof.

In operation, and referring to FIGS. 42–44, in the initial position after a gear shift has been made by pivoting main lever 110 and after main lever 110 has returned to its initial position, slider post 154 of slider plate 150 is positioned at the junction of long section 78a and transverse short section 78b of inverted L-shaped guide track 78. This is shown by the dashed lines in FIGS. 42 and 44. In this position, pawl 108 of major pawl element 98 is in engagement with teeth 86, and cam 107 of major pawl element 98 engages recessed camming surface 149 of minor pawl element 140 to bias pawl 148 of minor pawl element 140 out of engagement with second set of teeth 88, as shown by dashed lines in FIGS. 42 and 44.

When side lever 168 is actuated by the thumb of the person so as to rotate side lever 168 in the direction of arrow 179 (FIG. 42), for example, in a range of 10 degrees to 30 degrees, side lever 168 pivots about pin 172 such that engagement end 173 of side lever 168 moves further into arcuate outer facing recess 122 and moves slider plate 150 inwardly in the direction of arrow 180 (FIG. 42) toward the opposite end of arcuate arm 116. This is shown by the solid lines in FIGS. 42 and 44. This causes slider post 154 to move into short section 78b of inverted L-shaped guide track 78. This locks main lever 110 to upper housing 16, that is, prevents main lever 110 from pivoting about the axis of pivot shaft 84. In like manner, when main lever 110 is actuated, side lever 168 is rendered ineffectual since slider post 154 is moved away from the pawls.

At the same time, slider post 154 engages engagement arm 104 of major pawl element 98 to rotate major pawl element 98 in the direction of arrow 182 (FIGS. 42 and 44) so as to move pawl 108 out of engagement with first set of teeth 86, as shown by solid lines in FIGS. 42 and 44. When major pawl element 98 is initially moved out of engagement with first set of teeth 86, minor pawl element 140 is also initially out of engagement with second set of teeth 88, whereby the spring force from the derailleur which acts on the cable, pulls the cable out of housing 12. Since the cable 12 is secured to pulley/gear 80, pulley/gear 80 starts to rotate in the direction of arrow 184. However, at this time, since major pawl element 98 is rotated by slider post 154, cam 107 thereof no longer engages recessed camming surface 149 of minor pawl element 140, whereby minor pawl element 140 is rotated by spring 166 in the direction of arrow 186 such that pawl 148 thereof engages with upper arcuate surface 88a of one tooth of second set of teeth 88, as shown by solid lines in FIGS. 42 and 44. Specifically, pawl 148 catches upper arcuate surface 88a of a tooth of second set of teeth 88 after gear/pulley 80 has been freed to rotate by one tooth. When side lever 168 is released, spring 153 biases slider plate 150 to the right in FIG. 42, and thereby pivots side lever 168 in the clockwise direction of FIG. 42. At this time, since major pawl element 98 is no longer restrained by slider post 154, spring 106 biases major pawl element 98 back to the dashed line position in FIGS. 42 and 44, such that raised pawl 108 once again engages first set of teeth 86 to prevent rotation of pulley/gear 80, and at the same time, cam 107 thereof engages recessed camming surface 149 of minor pawl element 140 to rotate minor pawl element 140 by a cam action against the force of spring 116, to the dashed line position in FIGS. 42 and 44, out of engagement with second set of teeth 88. Thus, for each actuation of side lever 168, there is a gear shift of a single tooth in one direction.

As a modification, if side lever 168 is moved past an angle of about 30 degrees, that is, past a point of greater resistance, this will result in the release of pulley/gear 80, and will allow the derailleur to move to one extreme limit, whereupon side lever 168 would then return to its resting position.

To provide a reverse gear shift, arcuate arm 116 is rotated in the clockwise direction of FIG. 42. During this rotation, since minor pawl element 140 is mounted to arcuate arm 116, minor pawl element 140 moves away from major pawl element 98 which is mounted to upper housing 16. As a result, cam 107 no longer engages with recessed camming surface 149, and thereby major pawl element 98 no longer restrains minor pawl element 140. In this regard, coil spring 166 biases pawl 148 of minor pawl element 140 into engagement with arcuate upper surface 88a of one tooth of second set of teeth 88. At this time, pawl 108 of major pawl element 98 is still in engagement with first set of teeth 86. As arcuate arm 116 continues to rotate, the engagement of pawl 148 with second set of teeth 88, causes pulley/gear 80 to rotate therewith in a direction opposite to arrow 84, and thereby pull cable from the derailleur. During this rotation, pawl 108 of major pawl element 98 rides over and then engages the next tooth of first set of teeth 86 in a ratcheting manner. When arcuate arm 116 is released by the person, coil spring 114 functions to return arcuate arm 116 to its original position. At this time, because of the inclination of upper arcuate surface 88a of the engaged tooth, pawl 148 of minor pawl element 140 is permitted to ride down and off of that tooth so as to permit arcuate arm 116 to return to its original position. Thus, minor pawl element 140 hits against the next tooth of second set of teeth 88 and is pressed outwardly against the force of coil spring 166 and thereby rides over the same, until arcuate arm 116 is returned to its original position. Because of the engagement of pawl 108 of major pawl element 98 with first set of teeth 86, pulley/gear 80 is prevented from rotating back at this time. When arcuate arm 116 returns to its original position, cam 107 engages recessed surface 147 to maintain minor pawl element 140 out of engagement with second set of teeth 88. In a preferred embodiment, main lever 110 rotates in the range of 10 degrees to 12 degrees of its arc for one gear shift. It is possible, however, during a single lever movement, to rotate main lever 110 approximately 45 degrees to shift four gears at once. Thereafter, main lever 110 returns to its rest position.

Figure 45:
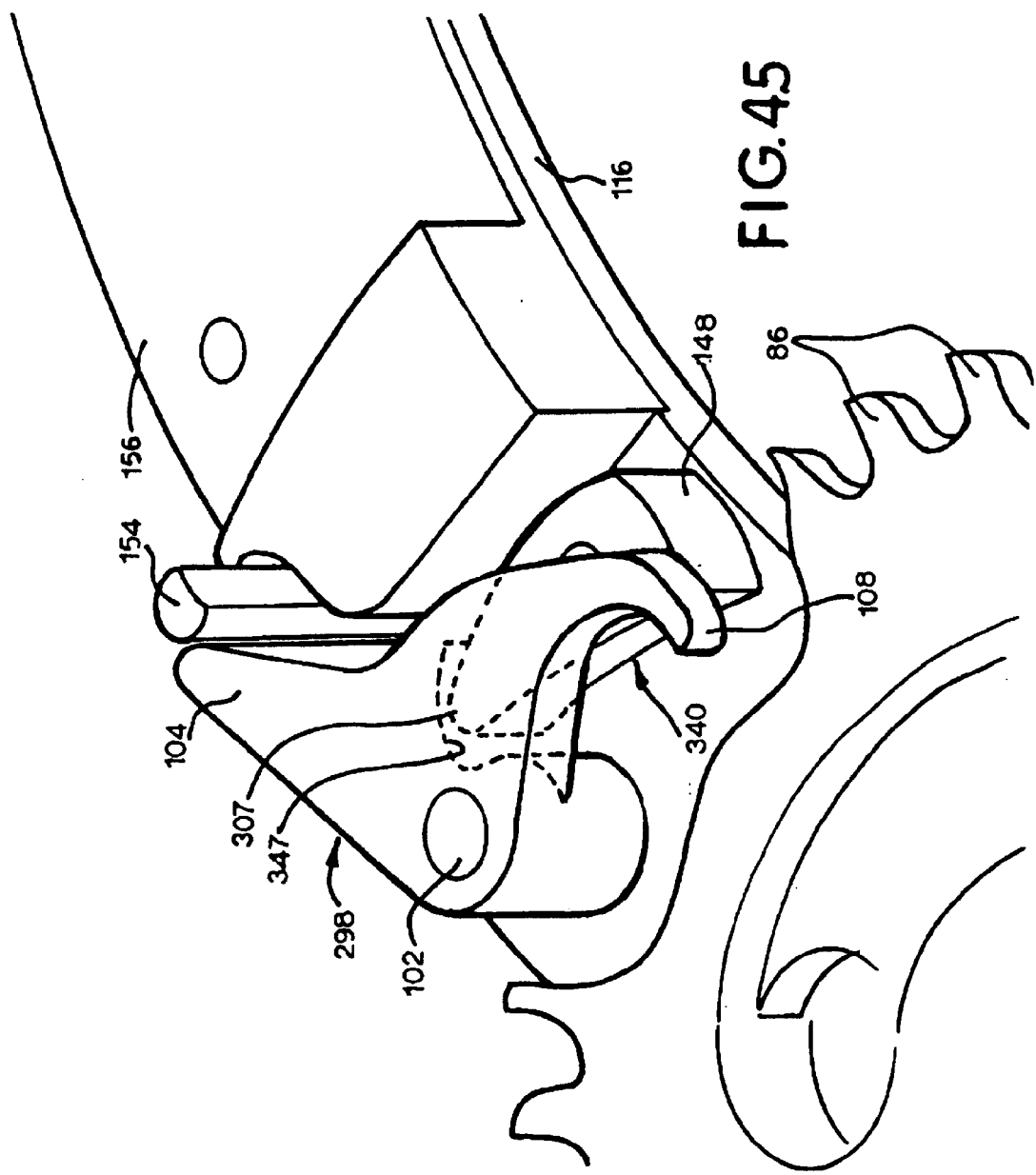
FIG. 45 is an enlarged perspective view of a portion of the shift lever according to another embodiment of the present invention, with the pulley/gear cut away, to show operation thereof.
Figure 46:
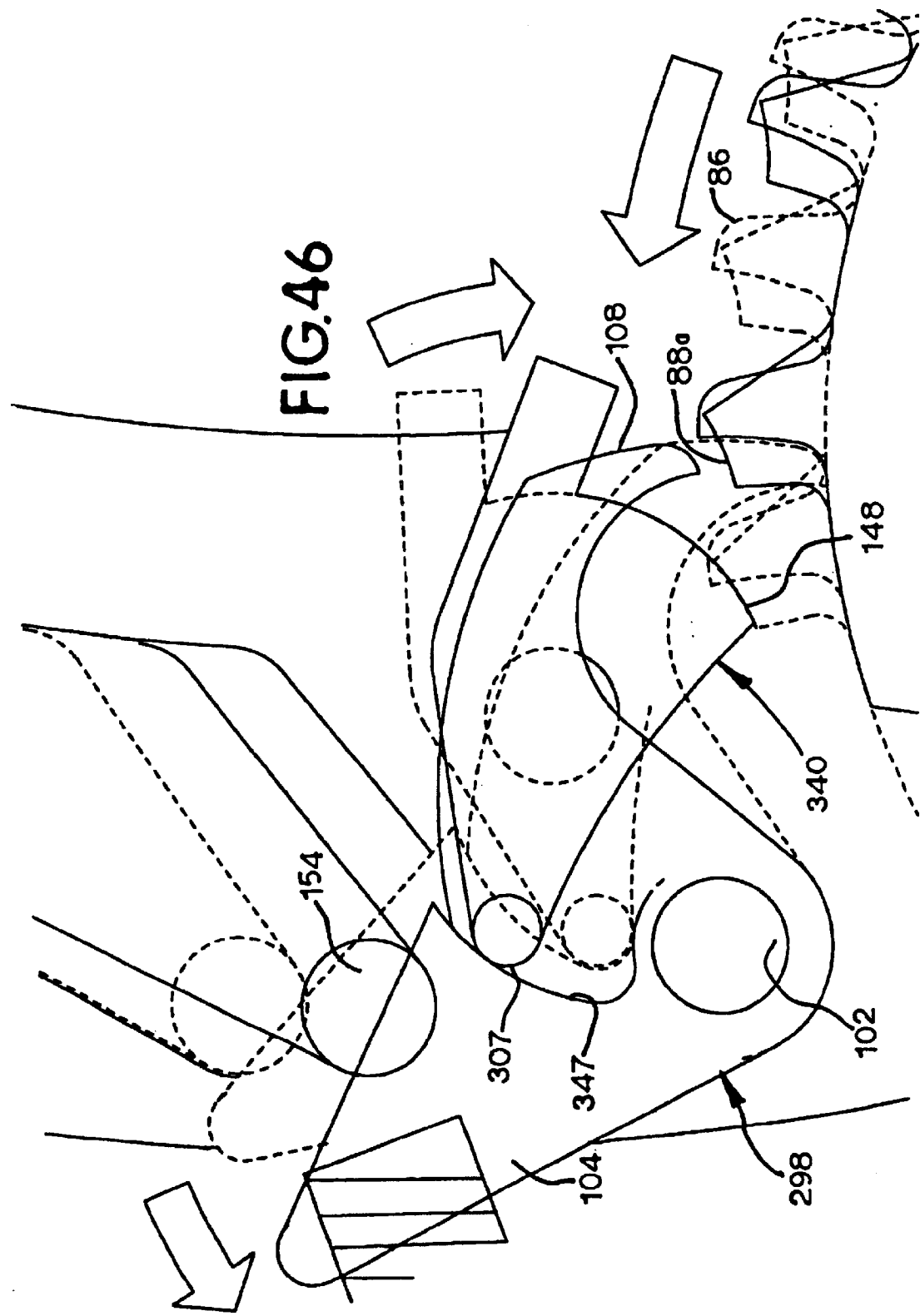
FIG. 46 is an enlarged top plan view of a portion of the shift lever of FIG. 45, to show operation thereof.

Referring now to FIGS. 45 and 46, there is shown a modified shift lever 210 according to another embodiment of the present invention, in which common elements are denoted by the same reference numerals, and the modified elements are augmented by 200. Shift lever 210 is essentially the same as shift lever 10, except that the cam 307 which performs the cam operation is formed on an end of minor pawl element 340, and the recessed camming surface 347 which receives apex 307 is formed on the major pawl element 298. In other words, the cam and camming surfaces are reversed from that of shift lever 10. The remainder of the structure and operation remains the same.

Referring now to FIGS. 47–53, there is shown a modified shift lever 310 according to another embodiment of the present invention, in which common elements are denoted by the same reference numerals as shift lever 10, and the modified elements are augmented by 300. Shift lever 310 uses a dual pivot minor pawl.

Specifically, as shown in FIGS. 49 and 50, minor pawl element 440 includes a slightly arcuate slot 444 having a first end 444a and a second end 444b. Minor pawl element 440 has an extension 445 at one end, with a post 447 extending upwardly from extension 445. Post 447 has a concave recess 447a. A side recess 449 is provided on an opposite surface of minor pawl element 440, and separates a first pawl surface 448a from a second pawl surface 448b. Major pawl element 398 has a similar shape and configuration to major pawl element 98, but with minor differences in dimensions to account for the different shape of minor pawl element 440, as shown in FIGS. 47 and 48. There is also a pin 490 mounted to the upper surface of arm 116 of main lever 110 adjacent minor pawl post 142.

Figure 51:
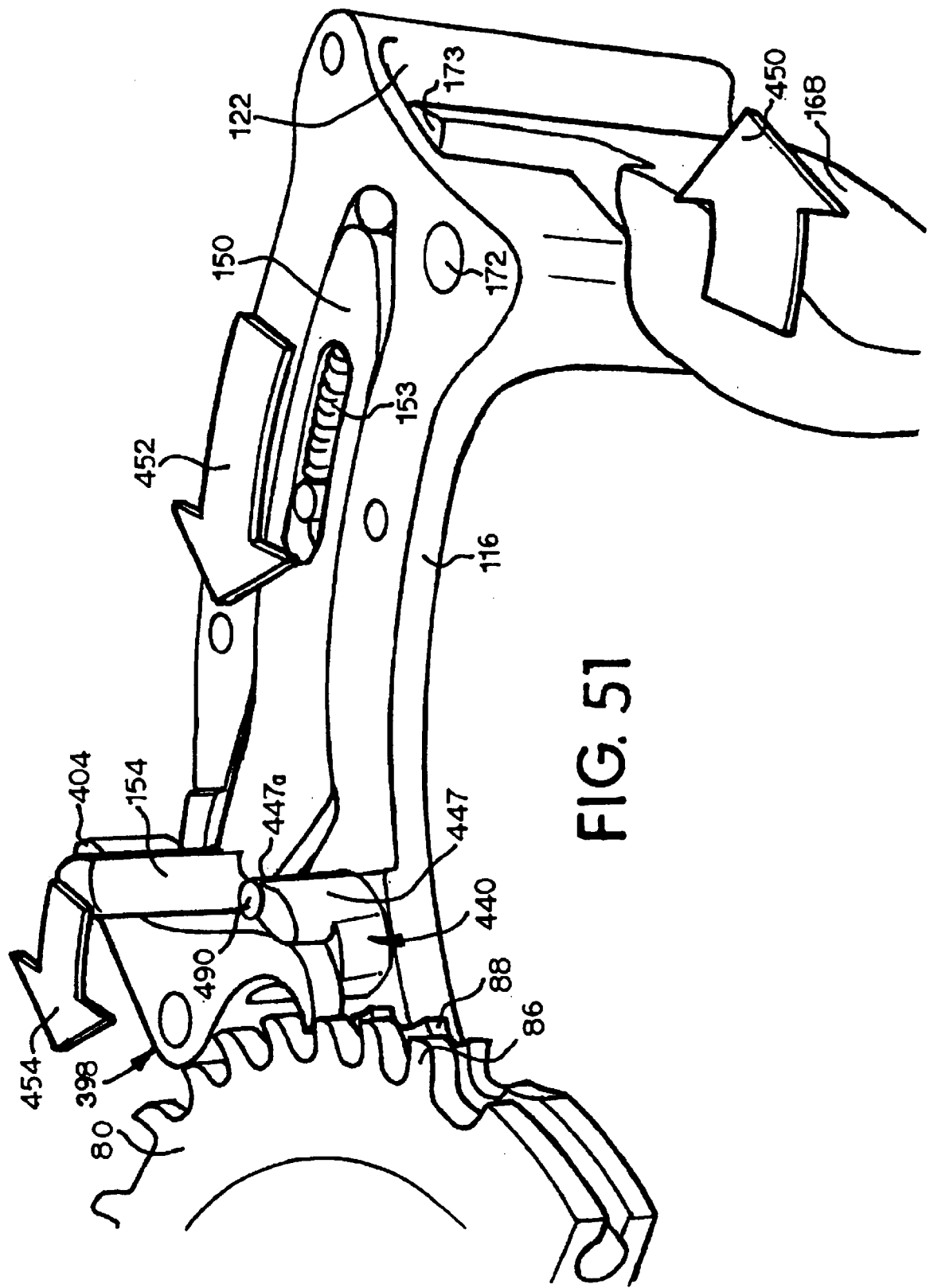
FIG. 51 is an enlarged perspective view of a portion of the shift lever of the last embodiment, with the cover plate removed, to show operation thereof.

In operation, and referring to FIGS. 51–53, in the initial position after a gear shift has been made by pivoting main lever 110 and after main lever 110 has returned to its initial position, slider post 154 of slider plate 150 is positioned at the junction of long section 78a and transverse short section 78b of inverted L-shaped guide track 78, as shown by dashed lines in FIG. 53. In this position, pawl 408 of major pawl element 398 is in engagement with teeth 86.

When side lever 168 is actuated by the thumb of the person so as to rotate side lever 168 in the direction of arrow 450 (FIG. 51), side lever 168 pivots about pin 172 such that engagement end 173 of side lever 168 moves further into arcuate outer facing recess 122 and moves slider plate 150 inwardly in the direction of arrow 452 (FIGS. 51 and 53) toward the opposite end of arcuate arm 116. This causes slider post 154 to move into short section 78b of inverted L-shaped guide track 78. This locks main lever 116 to upper housing 16, that is, prevents main lever 116 from pivoting about the axis of pivot shaft 84.

At the same time, slider post 154 engages engagement arm 404 of major pawl element 398 to rotate major pawl element in the direction of arrow 454 (FIGS. 51–53) so as to move pawl 408 out of engagement with first set of teeth 86, as shown by solid lines in FIGS. 42 and 44. Initially, first pawl surface 448a of minor pawl element 440 is in engagement with second set of teeth 88. However, when major pawl element 398 is initially moved out of engagement with first set of teeth 86, arcuate outer surface 408a of pawl 408 of major pawl element 398 hits against post 447 of minor pawl element 440 to rotate minor pawl element 440 in the counter-clockwise direction at end 444b, as shown by arrow 456 in FIGS. 52 and 53, around minor pawl post 142. As a result, first pawl surface 448a of minor pawl element 440 is removed from second set of teeth 88. As minor pawl element 440 continues to rotate, recess 447a hits against pin 490, and then minor pawl element 440 slides along minor pawl post 142 and rotates about the pivot axis of pin 490, until minor pawl post 142 is positioned at the opposite end 444a of slot 444 as a new position point. During this sliding and rotating movement, first pawl surface 448a of minor pawl element 440 is moved out of engagement with second set of teeth 88. As a result, pulley/gear 80 is permitted to rotate by the action of the cable being pulled out of housing 12 by the spring force from the derailleur. However, during the sliding movement and the rotation, second pawl surface 448b is moved into engagement with the upper surface 88a of one tooth of the second set of teeth 88. Accordingly, pulley/gear 80 is once again engaged and is thereby permitted to move by one gear tooth.

Specifically, second pawl surface 448b catches upper arcuate surface 88a of a tooth of second set of teeth 88 after pulley/gear 80 has been freed to rotate by one tooth. When side lever 168 is released, spring 153 biases slider plate 150 to the right in FIG. 51, and thereby pivots side lever 168 in the clockwise direction of FIG. 51. At this time, since major pawl element 398 is no longer restrained by slider post 154, spring 106 biases major pawl element 398 back to the dashed line position in FIG. 53 and the sold line position in FIG. 52, such that raised pawl 408 once again engages first set of teeth 86 to prevent rotation of pulley/gear 80. At the same time, minor pawl element 440 is forced by spring action of spring 166 to rotate such that first pawl surface 448a once again engages second set of teeth 88. Thus, for each actuation of side lever 168, there is a gear shift of a single tooth in one direction. Unlike the previous two embodiments, spring 166 hooks into hole 440a of minor pawl element 440 to pull back into spring housing 162, rather than biasing outwardly.

The reverse gear shift arrangement operates in the same manner as in the first embodiment of shift lever 10.

Figure 6:
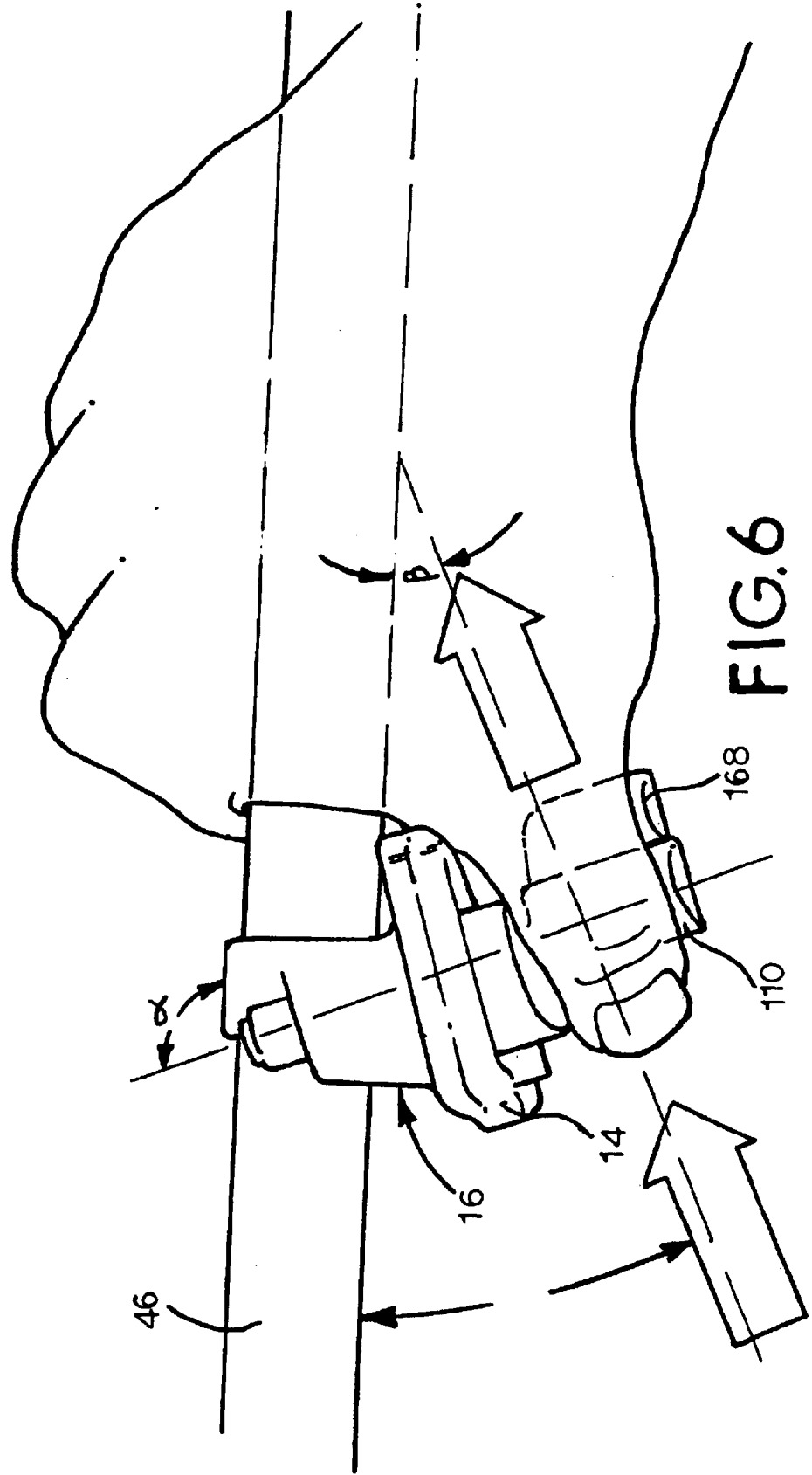
FIG. 6 is a rear elevational view of the shifter, showing the arc movement of the main lever being at an angle to the center line of the handlebar.

It will be appreciated that the essence of the present invention is the movement of the main lever in the natural movement direction of the thumb in order to tighten the grip during a shifting operation. It will be appreciated from FIG. 6 that the pivoting axis of main lever 110 is not 90 degrees to handlebar 46, but rather is an angle which is preferably in the range of 110 degrees to 140 degrees to handlebar 46. Therefore, the lever sweep plane is preferably an angle which is in the range of 10 degrees to 40 degrees from a line parallel to handlebar 46, as also shown in FIG. 6. This is the same range of angle at which the thumb is oriented when the hand is holding handlebar 46, and follows the natural movement of the thumb. The pivoting axis of side lever 168 is perpendicular to this sweep plane.

Figure 5:
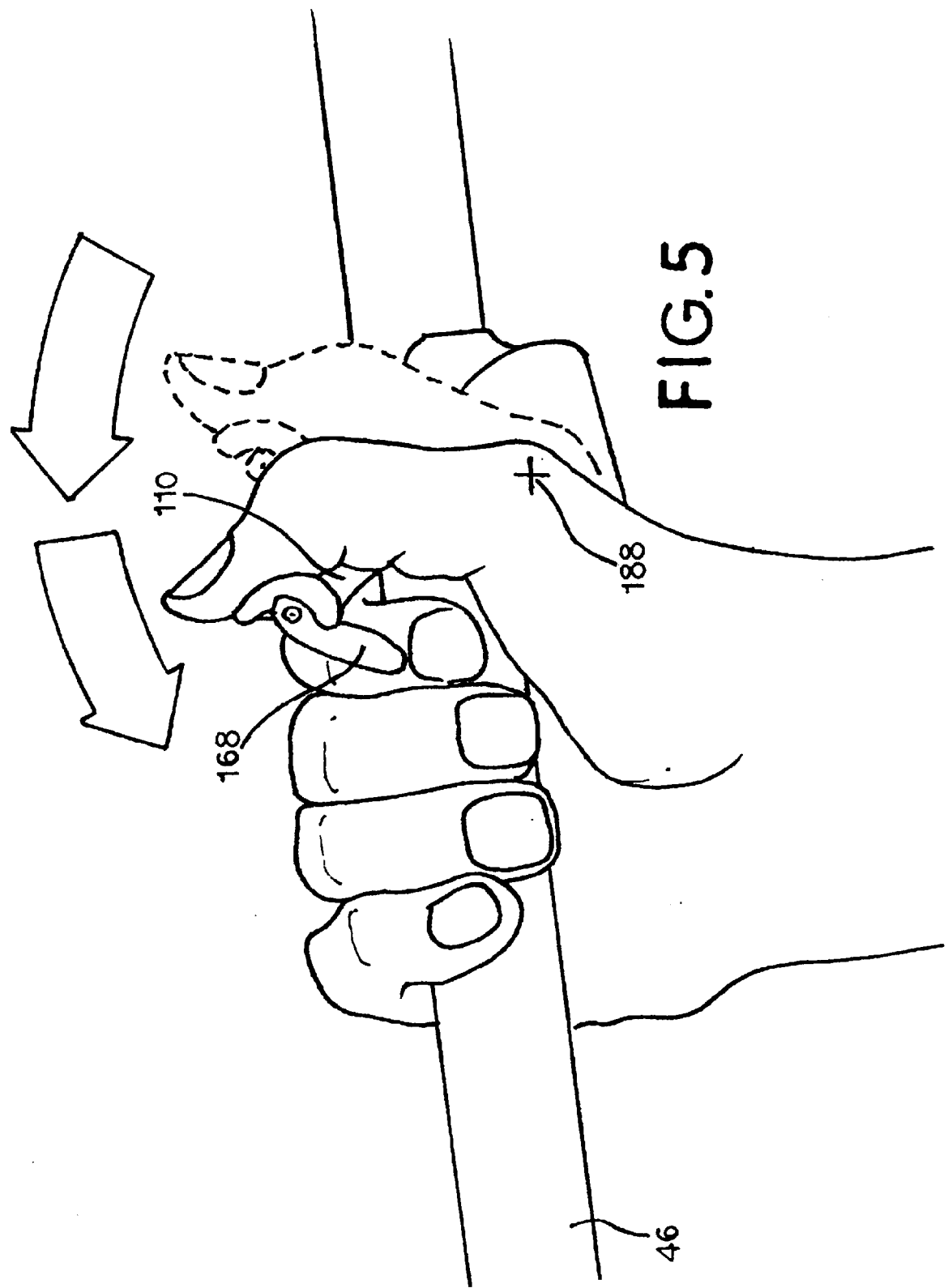
FIG. 5 is a bottom plan view of the shifter mounted to a handlebar, showing the arc movement of the thumb and main lever sharing the same pivot point.

Further, unlike conventional shift levers, the shift lever according to the present invention has its lever pivot point located behind the handlebar 46, very close to the knuckle of the thumb, so that the thumb and lever share the same point of rotation. However, the activation point of the main lever, that is, thumb actuator section 118, is located forward of the bar in its inactivated position. This eliminates "reach back" of the thumb to find the lever, as in other shifters. This also keeps the main lever close to the thumb tip when the hand is wrapped around the handlebar, as shown in FIG. 5.

In addition, the same thumb is used to actuate the side lever for the reverse shift operation.

Figure 3:
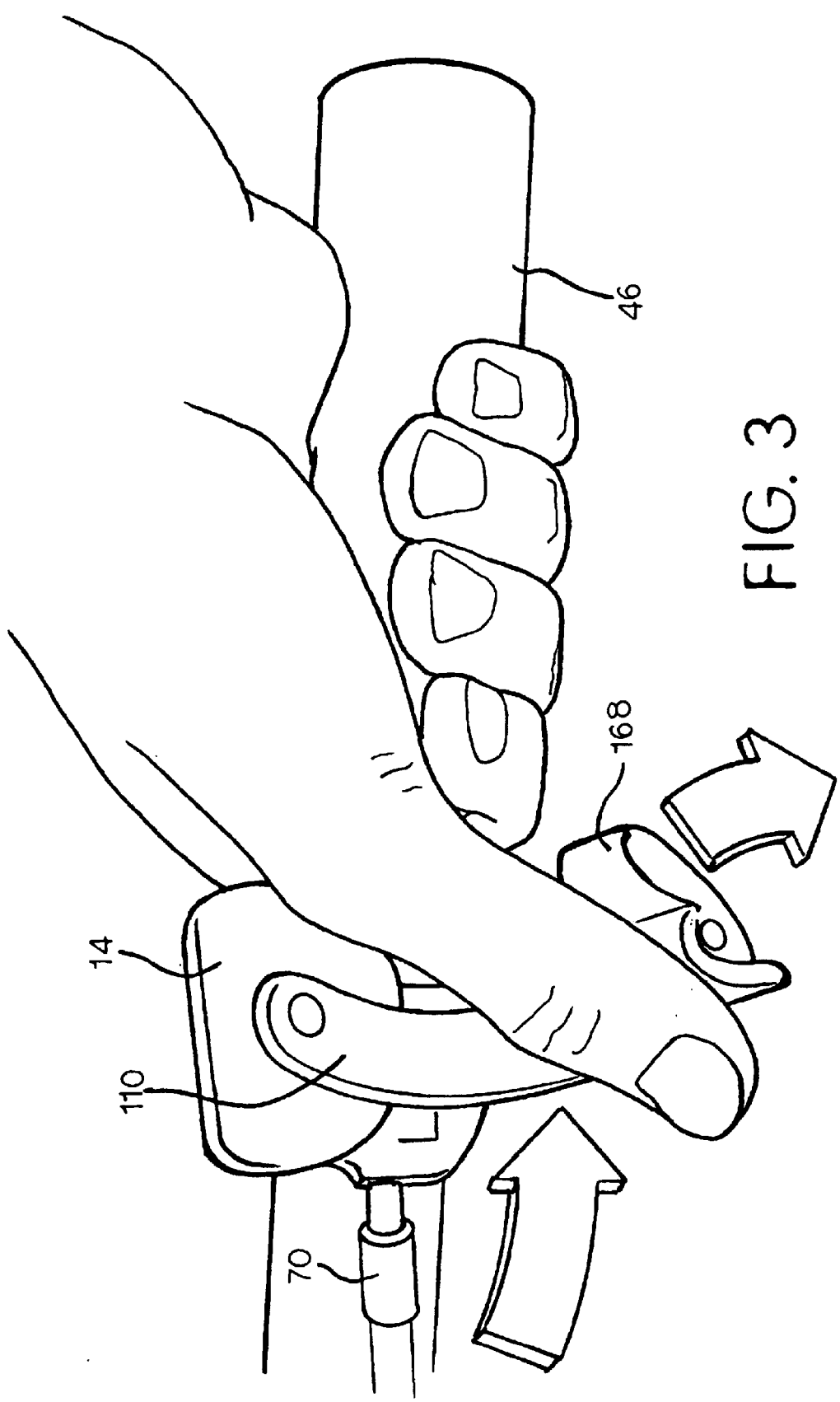
FIG. 3 is a perspective view of the shifter mounted on a handlebar, viewed from the bottom, with the main lever not yet being biased, and showing the direction of main lever and side lever movements.
Figure 4:
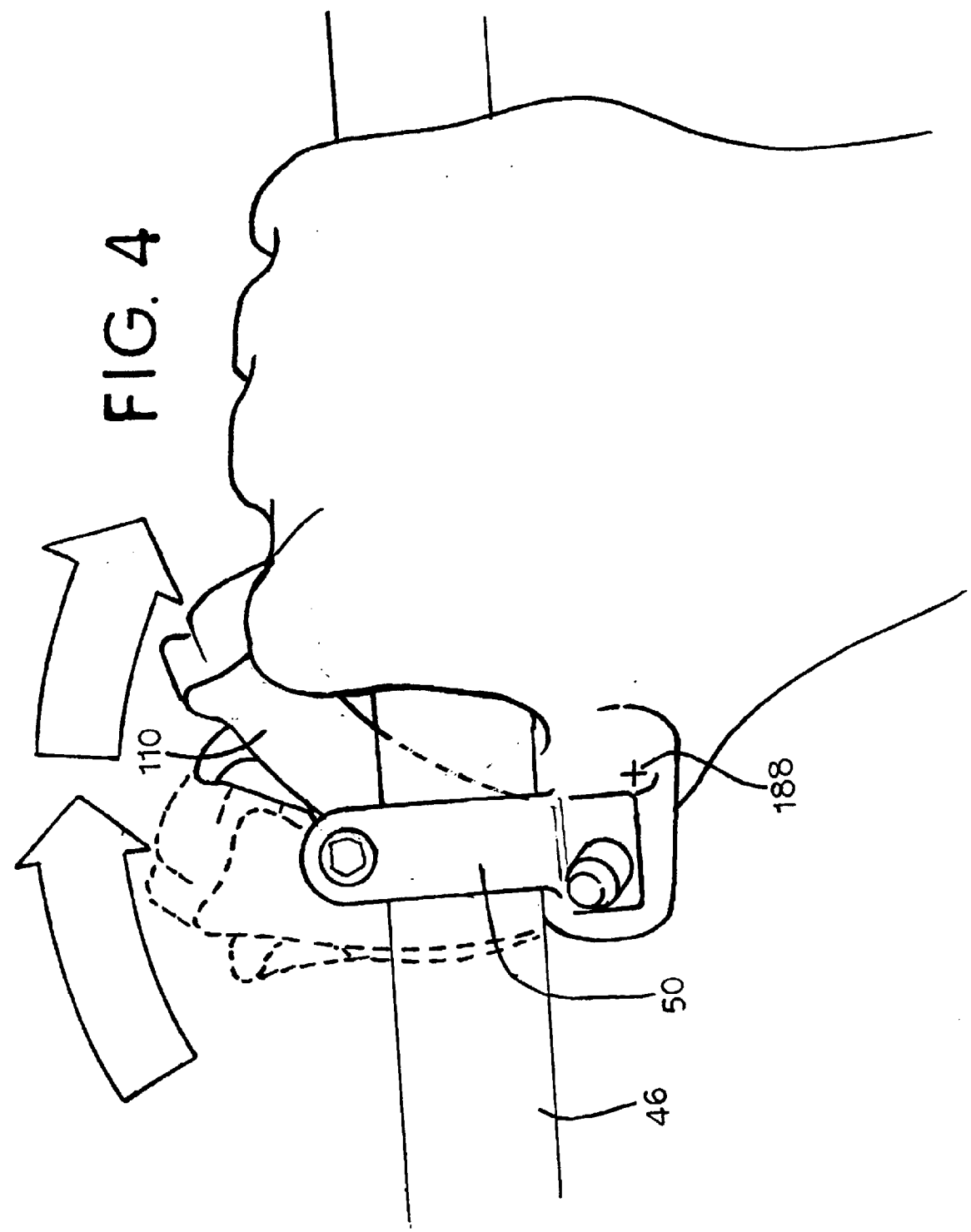
FIG. 4 is a top plan view of the shifter mounted to a handlebar, showing the arc movement of the thumb and main lever sharing the same pivot point.

Thus, with the present invention, the shift lever provides only minimal repositioning of the hands to actuate the shift lever in the form of arcuate arm 116 or side lever 168, depending on the direction of the shifting operation, so that the thumb and index finger remain wrapped around the handlebar, substantially in contact therewith at all times. Further, the lever movement of main lever 110 coincides with the natural movement of the thumb to bring the thumb in closer to the other fingers and thereby increase the grip. In other words, the shifting is at the same arc to the handlebar as the thumb to mimic natural movement of the thumb and along the same axis 188 (FIGS. 4 and 5), which corresponds to the axis of the knuckle of the thumb. Specifically, when actuating the shift lever, the thumb reaches forward as shown in FIG. 3, rather than back, to activate the shift lever, and then brings the lever inwardly to tighten the grip, as shown in FIG. 4. Because of the present arrangement, when the thumb is brought inwardly, there is no restriction from other components of the bicycle, such as the brake, etc.

Thus, although a specific arrangement has been provided with respect to the major pawl element and minor pawl element for effectuating the shifting operation, the broad aspect of the present invention is intended to cover any shifting arrangement which uses a main lever in which the main lever is actuated by the thumb of a person to move in a direction corresponding to the natural thumb movement in order to tighten the grip on the handlebar. Thus, the movement of the main lever complements the natural motion of the thumb to close the grip around the handlebar.

With the present invention, the palm of the hand stays on the bar because the thumb does not have to reach back for the lever, thereby retaining the integrity and safety of the closed hand grip on the handlebar. Thus, the closed hand on the handlebar allows operation of the shift lever while maintaining the hand fully wrapped around the handlebar as in a normal riding position. This complements an aggressive riding hand position, as in racing where a tight grip is essential. A fully closed hand on the handlebar means less effort to hold onto the handlebar and a stronger connection to the handlebar. Further, no bending of the wrists is required, which further offers better control in rough riding conditions.

Figure 7:
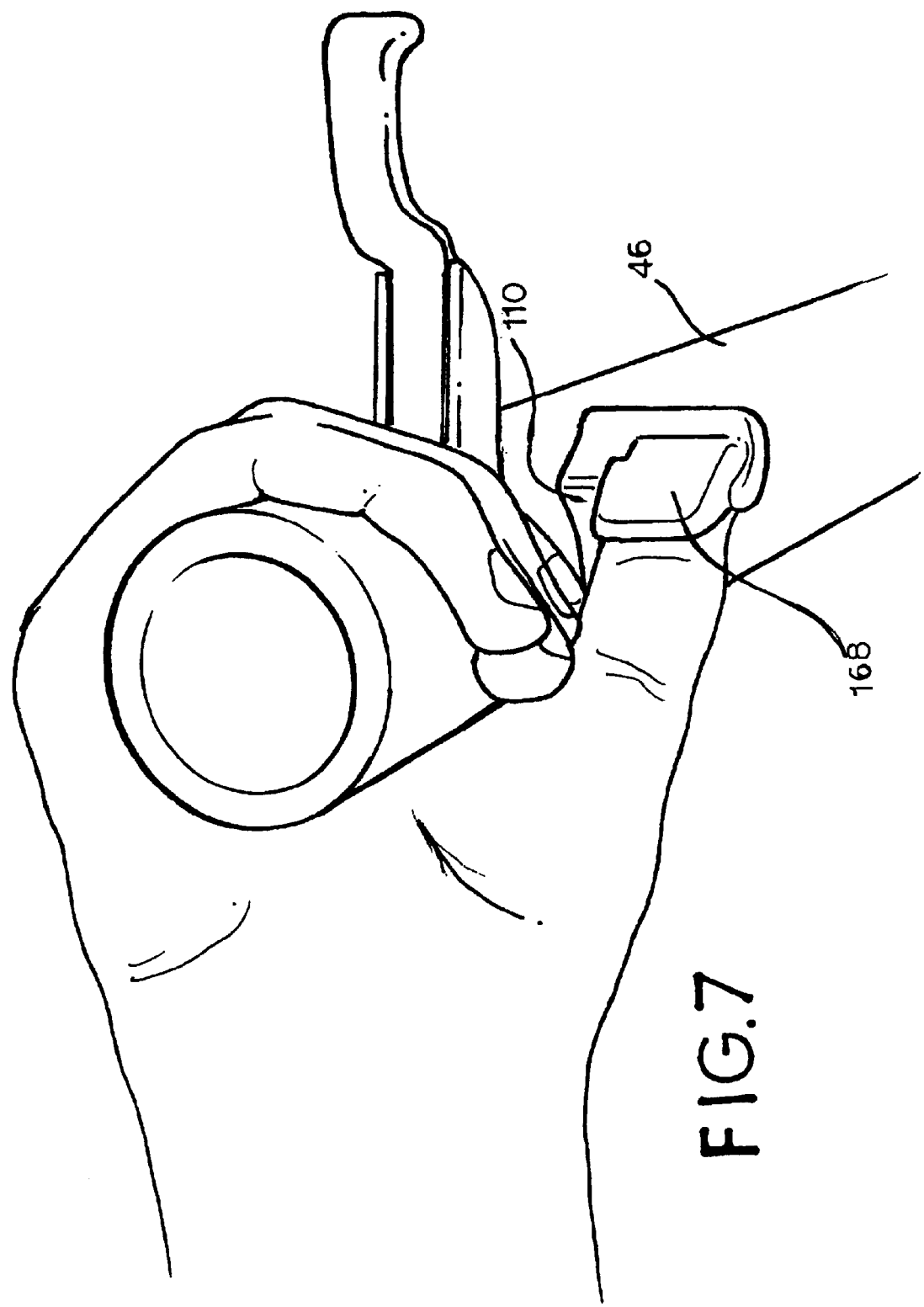
FIG. 7 is an outer end perspective view of the shifter, showing full finger wrap around the handlebar.
Figure 8:
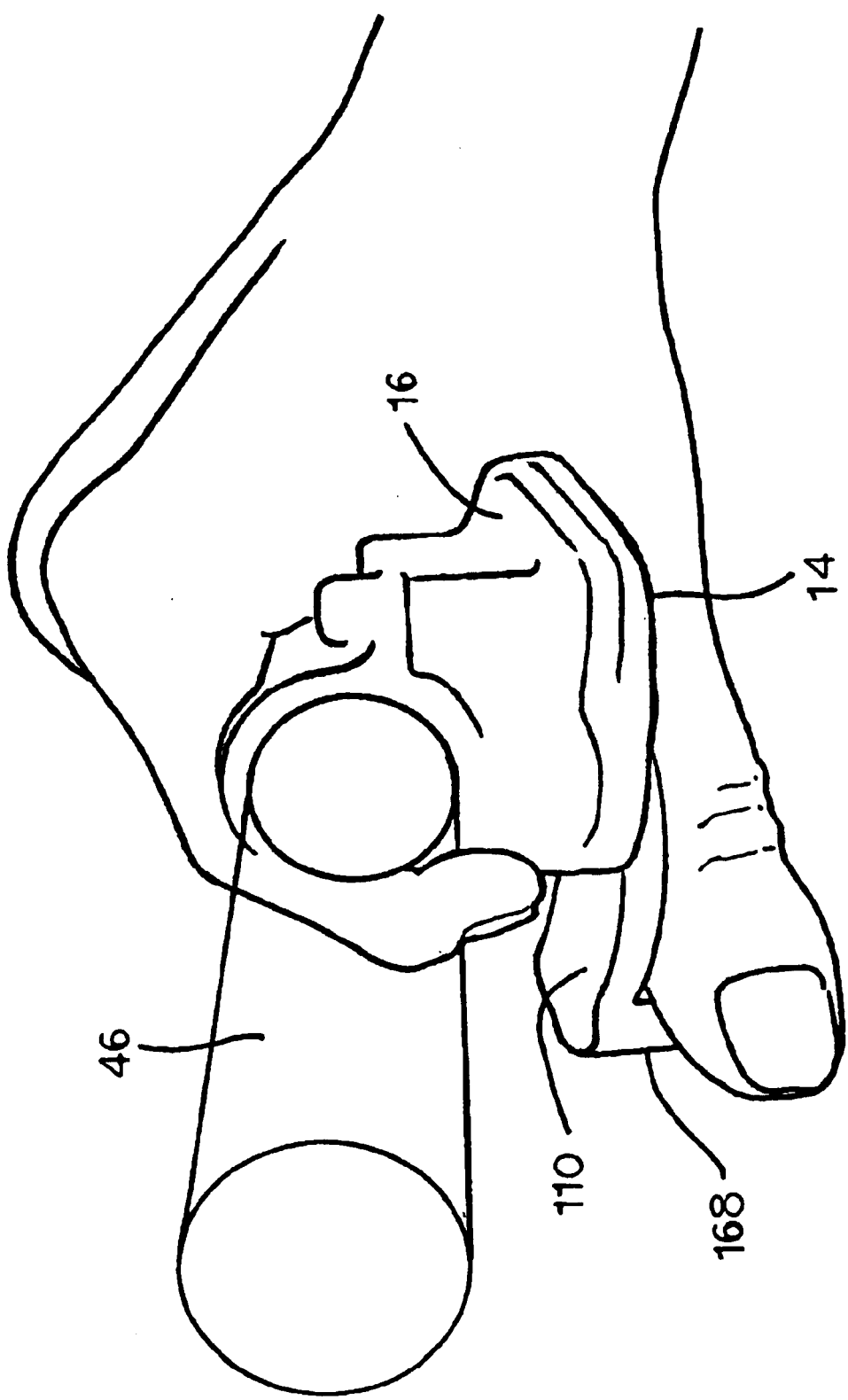
FIG. 8 is an opposite inner end perspective view of the shifter, showing full finger wrap around the handlebar.

Further, the thumb is the only finger used for shifting in one direction by means of arcuate arm 116 and in the opposite direction by means of side lever 168, both actions being an extension of the natural movement of the thumb, as shown in FIG. 3, and complement a closed hand grip position. Thus, repositioning of the hand is not required for activation of the side lever 168 since side lever 168 is mounted to main lever 110 for return shifting. The index finger is not used to shift at all. Thus, the strongest finger is used for gripping and the thumb is not used at all for shifting, which would otherwise open the curl of the hand and reduce the integrity of the grip, as shown in FIGS. 7 and 8. Therefore, all fingers remain curled around the handlebar during shifting to maintain a secure grip. This also leaves the index finger as a dedicated finger for performing a braking operation and for gripping the handlebar, because it is not needed for shifting, unlike conventional shift levers. This is important because the index finger opposes the thumb for tightening the grip.

Further, with the present invention, more room is allowed for the fingers to wrap around the handlebar because there are no levers in the way of the fingers/grip, as shown in FIGS. 7 and 8.

Although the present invention has been discussed above in regard to a mechanical shift lever, it could also be used with shift levers that are actuated by hydraulic, pneumatic or electric operation. In such case, the main lever and/or side lever would actuate a pneumatic valve, a hydraulic piston, and electrical switch, etc., and in such case, the pawl elements and pulley/gear would be eliminated. For example, the switch could send an electric signal to the; gear changing device mounted on or near the drive train of the bicycle. The pneumatic valve would apply air pressure through a line to the drive train. The hydraulic piston would apply pressure to a hydraulic line that would actuate the drive train.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A shift lever for a bicycle, comprising:
   a housing including a clamp head for mounting the housing on a handlebar of the bicycle and a cavity therein;
   a pulley/gear rotatably mounted in said cavity of said housing, said pulley/gear having a first set of teeth, a second set of teeth in spaced relation to said first set of teeth; and a recess between said first and second set of teeth for securing a biased cable;
   a first rotatable pawl element for engaging the first set of teeth, the first pawl element being mounted to the housing;
   a first spring for biasing the first pawl element into engagement with the first set of teeth;
   a main lever mounted to said housing for rotation relative to said housing and said pulley/gear, the main lever having a thumb engaging end adapted to be engaged by a thumb of a person to effect said rotation;
   a second pawl element rotatably mounted at a first pivot axis for engaging the second set of teeth, the second pawl element being mounted to the main lever and being engageable by the first pawl element;
   a second spring for biasing the second pawl element;
   a slider slidably mounted on said main lever, said slider including a slider post for engagement with said first pawl element in a biased position; and a side lever pivotally mounted to said main lever for moving said slider to said biased position;

whereupon for a shifting operation in a first direction, the main lever is rotated from a neutral position, whereupon the second pawl element moves away from the first pawl element and the second spring biases the second pawl element into engagement with the second set of teeth, whereby the pulley/gear rotates in a first direction with the main lever to pull the cable into the housing; and for a shifting operation in a second opposite direction, the side lever is actuated so as to move the slider to the biased position, causing the slider post to lock the main lever to the housing and to rotate the first pawl element out of engagement with the first set of teeth to permit the cable to be pulled out of the housing by the derailleur for a predetermined extent and thereby rotate the pulley/gear in a second, opposite direction, until the first pawl element releases the second pawl element, whereby the second spring biases the second pawl element into engagement with the second set of teeth to prevent further rotation of the pulley/gear.

2. A shift lever according to claim 1, further including a third spring for biasing said slider in a direction away from said biased position.

3. A shift lever according to claim 1, wherein said side lever is pivotally mounted to said thumb engaging end of said main lever.

4. A shift lever according to claim 3, wherein a sweep plane of movement of the main lever lies in a range of 10 degrees to 40 degrees with respect to a line parallel to the handlebar on which the shift lever is mounted, and a pivoting axis of the side lever is perpendicular to this sweep plane.

5. A shift lever according to claim 1, further including a pivot shaft fixed to said main lever and rotatably extending through said housing and said pulley/gear, and a third spring for biasing said pivot shaft, and thereby said main lever, to said neutral position.

6. A shift lever according to claim 1, wherein said first pawl element includes one of a cam surface and a camming surface and said second pawl element includes the other of the cam surface and the camming surface such that engagement of said cam surface and said camming surface results in said first pawl element rotating said second pawl element out of engagement with the second set of teeth.

7. A shift lever according to claim 6, wherein, upon release of the side lever, the first spring biases the first pawl element such that the first pawl element provides a camming action with the second pawl element to move the second pawl element out of engagement with the second set of teeth.

8. A shift lever according to claim 1, wherein:
said first pawl element includes a pawl for engaging the first set of teeth, an engagement section biased by the first spring and a bore for receiving a post about which said first pawl element is rotatable; and
said second pawl element includes a first pawl for engaging the second set of teeth, an engagement section biased by the second spring and a bore for receiving a post about which said second pawl element is rotatable.

9. A shift lever according to claim 8, wherein said bore of said second pawl element is formed as an elongated slot, and said second pawl element includes a second pawl for engaging the second set of teeth, such that for the shifting operation in the second opposite direction, the second pawl element moves in a rotating and sliding movement, with said first pawl of the second pawl element initially engaging the second set of teeth and then being moved away from the second set of teeth by the first pawl element which causes the second pawl element to rotate and slide about a different pivot axis.

10. A shift lever according to claim 9, wherein said second pawl element includes an upstanding post which is engaged by said first pawl element for rotating and sliding said second pawl element.

11. A shift lever according to claim 1, wherein said first pawl element includes a cut away portion such that said pawl thereof is raised, and said second pawl element is positioned in said cut away portion below said raised pawl of said first pawl element.

12. A shift lever according to claim 1, wherein the main lever has a recess and the slider is slidably mounted in the recess.

13. A shift lever according to claim 1, further comprising an arrangement in the housing for engagement with the side lever when the slider is moved by the side lever so as to prevent rotation of the main lever.

14. A shift lever according to claim 1, wherein the side lever is rendered ineffectual upon rotation of the main lever.

15. A shift lever according to claim 1, wherein the clamp head is constructed so as to mount the shift lever to the handlebar in a manner such that the thumb engaging end is located forwardly of the handlebar and said main lever is adapted to pivot with the thumb of the person during a shifting operation with a person holding onto the handlebar, whereby a grip of the person is tightened on the handlebar on which the shift lever is mounted.

16. A shift lever for a bicycle having a drive train, comprising:
a housing including a clamp head for mounting the housing on a handlebar of the bicycle at a remote location from the drive train, the housing having a cavity therein;
a mechanism in the housing for controlling actuation of the drive train;
a main lever mounted to said housing for rotation relative to said housing, the main lever having a thumb engaging end adapted to be engaged by a thumb of a person to effect said rotation and the main lever being associated with the mechanism to activate the mechanism to control actuation of the drive train in a first direction;
a side lever pivotally mounted to said thumb engaging end of said main lever, said side lever adapted to be engaged by a thumb of a person and being associated with the mechanism to activate the mechanism to control actuation of the drive train in a second, opposite direction;
the clamp head is constructed so as to mount the shift lever to the handlebar in a manner such that the thumb engaging end is located forwardly of the handlebar and said main lever is adapted to pivot with the thumb of the person during a shifting operation with a person holding onto the handlebar, whereby a grip of the person is tightened on the handlebar on which the shift lever is mounted; and
a sweep plane of movement of the main lever lies in a range of 10 degrees to 40 degrees with respect to a line parallel to the handlebar on which the shift lever is mounted, and a pivoting axis of the side lever is perpendicular to this sweep plane.

17. A shift lever according to claim 16, wherein the mechanism is one of the following:
a) a pneumatic valve,
b) a hydraulic piston, and
c) an electric switch.

* * * * *